United States Patent [19]
Kline et al.

[11] Patent Number: 5,768,268
[45] Date of Patent: Jun. 16, 1998

[54] WIDEBAND BASE STATION ARCHITECTURE FOR DIGITAL CELLULAR COMMUNICATIONS SYSTEM

[75] Inventors: Paul A. Kline; Timothy J. Harris, both of Germantown, Md.; Henry W. Anderson, Palatine, Ill.

[73] Assignee: Watkins Johnson Company, Palo Alto, Calif.

[21] Appl. No.: 504,175

[22] Filed: Jul. 19, 1995

[51] Int. Cl.$^6$ ................................................ H04Q 11/04
[52] U.S. Cl. ........................ 370/330; 370/336; 370/345; 455/42
[58] Field of Search ........................ 370/310, 328, 370/331, 336, 337, 345, 329, 330, 343; 379/59, 60; 455/33.1, 33.2, 76, 422, 39, 42, 507, 517; 375/295, 298, 302

[56] References Cited

U.S. PATENT DOCUMENTS

| | | | |
|---|---|---|---|
| 4,513,412 | 4/1985 | Cox | 370/29 |
| 4,670,899 | 6/1987 | Brody et al. | 370/60 |
| 4,675,863 | 6/1987 | Paneth et al. | 370/50 |
| 4,901,310 | 2/1990 | Ichiyoshi | 370/343 |
| 4,903,125 | 2/1990 | Parker | 375/38 |
| 4,926,421 | 5/1990 | Kawano et al. | 370/331 |
| 5,001,742 | 3/1991 | Wang | 379/60 |
| 5,084,903 | 1/1992 | McNamara et al. | 370/69.1 |
| 5,134,633 | 7/1992 | Werner | 375/38 |
| 5,170,413 | 12/1992 | Hess et al. | 370/69.1 |
| 5,208,804 | 5/1993 | Wilson et al. | 370/343 |
| 5,289,464 | 2/1994 | Wang | 370/330 |
| 5,425,031 | 6/1995 | Otsuka | 370/336 |
| 5,428,602 | 6/1995 | Kemppainen | 370/330 |
| 5,432,779 | 7/1995 | Shimo et al. | 370/330 |
| 5,490,136 | 2/1996 | Sereno et al. | 370/345 |
| 5,490,172 | 2/1996 | Komara | 375/296 |
| 5,521,938 | 5/1996 | Stewart et al. | 375/206 |
| 5,581,548 | 12/1996 | Ugland et al. | 370/330 |

FOREIGN PATENT DOCUMENTS

| | | | |
|---|---|---|---|
| 0 439 926 A2 | 12/1990 | European Pat. Off. | H04Q 7/04 |
| WO 94/28690 | 8/1994 | WIPO | |
| WO 95/33350 | 12/1995 | WIPO | H04Q 7/30 |

OTHER PUBLICATIONS

Prospectus for Common Stock Offering, Steinbrecher, Jul. 1, 1994.

(List continued on next page.)

*Primary Examiner*—Alpus H. Hsu
*Assistant Examiner*—Kwang Bin Yao
*Attorney, Agent, or Firm*—Flehr Hohbach Test Albritton & Herbert LLP

[57] ABSTRACT

An open-architecture digital cellular base station readily adapted to support communication over a variety of air interface standards is disclosed herein. The base station includes a wideband digital transceiver system having transmit and receive sections. Within the transmit section, an input line interface operates to couple a plurality of input information signals onto a time-division multiplexed (TDM) transmit bus. A plurality of digital transmitter modules are coupled to the TDM transmit bus, each of the digital transmitter modules generating a set of digital baseband signals in response to a corresponding set of the plurality of input information signals. The set of digital information signals are applied to a wideband summation network disposed to sequentially add the set of digital information signals into a wideband data stream. A wideband transmitter then generates a wideband transmission waveform using the wideband data stream. The receive section includes a wideband receiver for: (i) receiving an incident composite signal, and (ii) generating a digital representation of the incident composite signal in the form of a wideband digital data stream applied to a wideband data bus. A plurality of digital receiver modules are coupled to the wideband data bus. Each digital receiver module functions to recover a set of digital output signals from the wideband digital data stream, as well as to multiplex the set of digital signals onto a TDM receive bus. An output line interface serves to distribute the digital output signals among a plurality of output signal lines.

18 Claims, 13 Drawing Sheets

OTHER PUBLICATIONS

J.Decaluwe, J.M. Rabacy, J.L. Van Meerberger & H.J. DeMan, "Interprocessor communication in Synchronous Multiprocessor Digital Signal Processing Chips," IEEE *Transactions on Acoustics, Speech & Signal Processing* vol. 37 No. 12. Dec.1989. pp. 1816–1828.

J.G. Proakis & D.G. Manolakis, *Introduction to Digital Signal Processing*, Macmillan,Nwe York 1988, pp. 395–500 and 795–848.

*IEEE Standard Dictionary of Electrical and Electronics Terms*, 1984. p. 82.

R.E. Crochiere and L.E. Rabiner, *Multirate Digital Signal Processing*, Prentice–Hall 1983. Ch.7, pp. 289–310.

G.A. Arrendondo, J.C. Feggeler & J.I. Smith, *The Bell System Technical Journal*, vol. 58, pp. 97–122 (Jan. 1979).

N. Ehrlich, R.E. Fisher & T.K. Wingard, *The Bell System Technical Journal*, vol. 58 pp. 153–199 (Jan. 1979).

W.C. Jakes, *Microwave Mobile Communications*, Wiley, New York. 1974, pp. 172–173.

R.E. Crochiere & L.R. Rabiner, "Multirate Techniques in Filter Banks and Spectrum Analyzers and Synthesizers," *Multirate Digital Signal Processing*, Prentice–Hall, Inc., 1983.

Cox and Reudink, "Increasing Channel Occupancy in Large–Scale Mobile Radio System: Dynamic Channel REassignment", *IEEE Trans. on Veh. Tech.* VT–22(4):218–222 (1973).

Crochiere and Rabiner, "Multirate Digital Signal Processing" pp. 4–7 and 231–235 (1983) (Prentice–Hall, Inc., Englewood Cliffs, NJ).

Cyr and Wala, "Digital Radio Frequency Transport Enhances Cellular Network performance" webmaster@tellabswireless.com (1993) (INTERTEC® Publishing, Chicago, IL).

Frodigh, "Reuse–Partitioning Combined with Traffic Adaptive Channel Assignment for Highway Microcellular Radio Systems", *IEEE* Feb. 1992. pp. 1414–1418.

Hogenauer, "An Economical Class of Digital Filters for Decimation and Interpolation", *IEEE Trans. on Acoustics, Speech, and Signal Proc.* ASSP–29(2):155–162 (1981).

I and Chao, "Local Packing—Distributed Dynamic Channel Allocation at Cellular Base Station", *IEEE* 1993, pp. 293–301.

Kuek and Wong, "Ordered Dynamic Channel Assignment Scheme with Reassignment in Highway Microcells", *IEEE Trans. on Vehicular Tech.* 41(3):271–277 (1992).

Onoe and Yasuda, "Flexible Re–use for Dynamic Channel Assignment in Mobile Radio Systems", *IEEE* Sep. 1989, pp. 472–476.

Vučetić, "A Hardware Implementation of Channel Allocation Algorithms Based on a Space–Bandwidth Model of a Cellular Network", *IEEE Trans. on Veh. Tech.* 42(4):444–455 (1993).

Zhang, "Comparisons of Channel–Assignment Strategies in Cellular Mobile Telephone Systems", *IEEE Trans. on Veh. Tech.* 38(4):211–215 (1990).

"DSP Functions on a Chip" Brochure from Graychip, Palo Alto, CA (May 1994).

"Solutions for Cellular Radio Base Stations", Brochure from Analog Devices, Norwood, MA (Feb. 1994).

"Transmission System for Communications", Fifth Ed., Bell Laboratories, Inc., pp. 871–877 (1982).

5,768,268

WIDEBAND BASE STATION ARCHITECTURE FOR DIGITAL CELLULAR COMMUNICATIONS SYSTEM

FIELD OF THE INVENTION

This invention relates generally to cellular telephone systems. More particularly, the invention relates to an open-architecture cellular telephone cell site base station disposed to digitally process wideband communication waveforms.

BACKGROUND OF THE INVENTION

Cellular telephone networks facilitate mobile communications within a given geographic area by dividing the area into spatially contiguous regions, or "cells". Each cell includes a base station, located at a "cell-site," which services mobile units within the cell. In typical analog cellular networks, each cell is assigned a different set of communication frequencies. The sets of frequencies assigned to adjacent cells are different, and are typically not repeated except when cells are separated by a sufficiently large "re-use" interval that interference problems are unlikely to occur. In this way, each channel within the cellular system may be used at a plurality of cell sites simultaneously, and the system is thereby enabled to support a number of users exceeding the number of system channels.

When a mobile unit travels from one cell into another, the call is transferred, or "handed-off" from the base station with which the mobile unit is in communication to the base station within the new cell. This call handoff process involves switching the mobile unit from its existing frequency to a new frequency allocated to the new cell into which the mobile unit is entering. The handoff process is generally coordinated by a mobile switching center (MSC) linked to each cell-site base station. In particular, the base station may issue a handoff request to the MSC when the signal received by a given mobile unit drops below a predefined threshold, which typically indicates that the given mobile unit is nearing a boundary between cells. At this juncture the MSC requests signal strength information from the base stations within each of the cells, and determines which base station is best able to handle the call. When the base station within the "new" cell reports a stronger signal strength, the call may be handed-off to the new base station.

Each cell site base station is typically outfitted with multiple pairs of transmitter and receivers, each such pair being tuned to a particular channel. When conventional analog equipment is used, each transmitter and receiver pair requires dedicated filtering, mixing and amplification circuitry. This is disadvantageous in that incremental cost is constant as channels are added. In addition, if a complete set of channels are desired to be made available, a channel switch or the like is employed to select the transmitter-receiver pairs operative at the frequencies assigned to the cell. This is also disadvantageous, since those transmitter-receiver pairs associated with unassigned frequencies are inefficiently idle. Finally, conventional analog base station designs may not be readily adapted to support the varying signal frequencies and formats peculiar to different types of cellular systems.

Accordingly, there is a need for a cellular base station in which each frequency channel is not required to be provided with a dedicated transmitter and receiver pair. It is further desired that the base-station signal processing hardware may be efficiently allocated in response to changing patterns of user demand. Finally, there is a need for a base-station architecture readily adaptable for use in a variety of cellular systems using various modulation techniques.

SUMMARY OF THE INVENTION

In summary, this invention comprises an "open architecture" digital cellular base station capable of being easily modified to support communication over a variety of air interface standards. In a preferred embodiment of the inventive base station there is incorporated a wideband digital transceiver system having transmit and receive sections.

Within the transmit section of the base station, an input line interface coupled to the public switch telephone network (PSTN) operates to multiplex a plurality of input information signals onto a time-division multiplexed (TDM) transmit bus. A plurality of digital transmitter modules are coupled to the TDM transmit bus, each of the digital transmitter modules being operative to generate a set of wideband digital baseband signals in response to a corresponding set of the plurality of input information signals. The set of wideband digital information signals are applied to a wideband summation network disposed to sequentially add the set of wideband digital information signals into a wideband data stream. A wideband transmitter then operates to generate a wideband transmission waveform using the wideband data stream.

The receive section includes a wideband receiver for: (i) receiving an incident composite signal, and for (ii) generating a digital representation of the incident composite signal in the form of a wideband digital data stream. The wideband digital data stream is applied to a wideband data bus, to which are coupled a plurality of digital receiver modules. Each digital receiver module functions to recover a set of digital output signals from the wideband digital data stream, and to multiplex the set of digital signals onto a TDM receive bus. An output line interface coupled to the PSTN is provided for distributing the digital output signals among a plurality of output signal lines.

BRIEF DESCRIPTION OF THE DRAWINGS

Additional objects and features of the invention will be more readily apparent from the following detailed description and appended claims when taken in conjunction with the drawings, wherein:

DETAILED DESCRIPTION OF THE PREFERRED EMBODIMENT

I. System Overview

Figure 1:
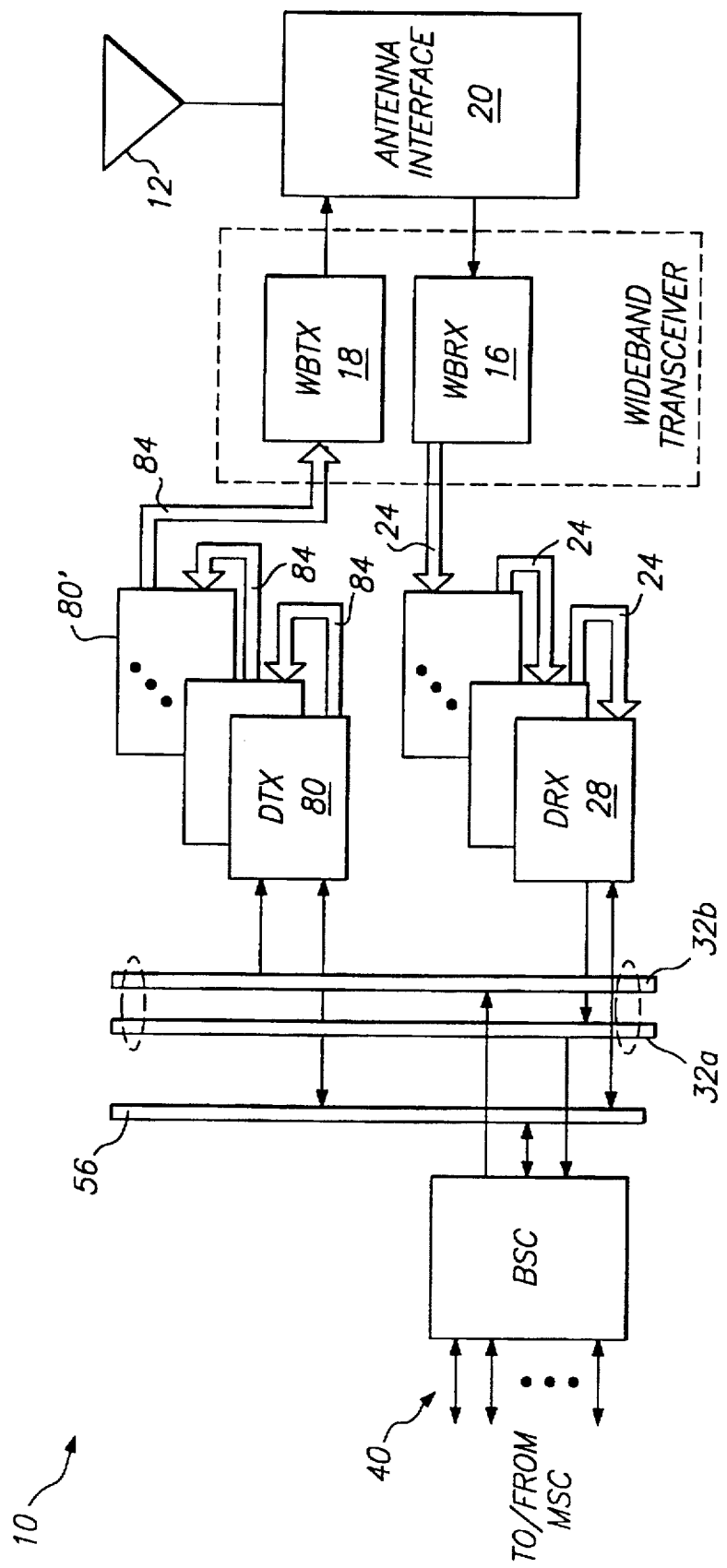
FIG. 1 is a functional block diagram of a cellular telephone cell site base station of the invention.

FIG. 1 is a functional block diagram of a digital cellular telephone cell site base station 10 for transmitting and receiving information signals to and from a plurality of mobile transceiver units (not shown) in accordance with the invention. As will be appreciated from the following discussion, the inventive cell site base station comprises an "open architecture" digital cellular base station capable of being easily modified to support communication over different air interface standards (e.g., AMPS, TDMA, CDMA). Although the base station of the invention will be described largely within the context of an exemplary AMPS cellular system, appropriate explanation will be provided as to the manner in which the base station may be adapted to be compatible with other air interface standards.

In an exemplary AMPS embodiment, the base station antenna system 12 receives an incident composite frequency-multiplexed signal comprised of a plurality of individual baseband signals from a corresponding plurality of mobile units. Typically, each individual communication channel within the incident composite frequency-multiplexed signal is spaced apart by 30 Khz, it being understood that other spacings could be used. The antenna system 12 is coupled to a wideband transceiver module comprised of a wideband receiver module (WBRX) section 16 and to a wideband transmitter (WBTX) section 18 through an antenna interface unit 20.

In the exemplary embodiment of FIG. 1, the antenna system 12 comprises two omnidirectional antennas disposed to provide coverage over the entire area of the geographic cell in which is situated the base station 10. A description will nonetheless also be provided of an alternate embodiment in which the inventive base station is configured for operation with a sectored antenna system (e.g., three 120 degree antennas). For sectored antenna systems, separate wideband transceiver modules (each including WBTX and WBRX sections) are deployed within the base station to service each sector. In addition, the manner in which the base station may be configured to support an implementation in which diversity reception through a pair of receive antennas within each sector will also be described.

II. Receive (RX) Mode Operation

After the incident composite frequency-multiplexed signal has been received at radio frequency (r.f.) by the antenna system 12 (FIG. 1), the WBRX section 16 translates frequency of the received r.f. signal to an analog baseband frequency. The analog baseband signal is then digitized into 12-bit samples by an analog to digital converter (not shown), and the resultant data stream is provided to a time-division multiplexed (TDM) local receive bus 24 operative at an exemplary rate of 30.72 Msps. In FIG. 1, the local receive bus 24 is implemented as a standard VXI Local Bus as specified in VXI Specification, IEEE Standard 1155. In embodiments of the base station in which a sectored antenna is deployed, the data stream from the WBRX section of the wideband transceiver module associated with each sector antenna are multiplexed into assigned time slots on the local receive bus 24.

As is indicated by FIG. 1, the local receive bus 24 provides the digitized data from the WBRX section 16 to each of a set of M digital receive (DRX) modules 28. Each DRX module 28 includes a set of K digital tuners, each of which extracts a narrow-band digital FM signal from the 30.72 Msps wideband data stream present on the local receive bus 24. The narrow-band output of each tuner is formatted as a complex data stream decimated to a rate of 80 Ksps. In an exemplary AMPS embodiment, the base station 10 includes up to five DRX modules 28 (i.e., M=5), each of which includes a set of twelve digital tuners (i.e., K=12). This allows up to sixty (M×K=5×12=60) frequency channels to be extracted from the incident composite r.f. frequency-multiplexed signal received by the antenna system 12. In an exemplary TDMA embodiment, each of the sixty frequency channels are further time-division multiplexed into three separate time slots, thereby allowing information to be received from up to 180 (i.e., 60×3) mobile units (assuming full rate TDMA).

Within each DRX module 28, each of the K digital tuners is followed by a digital demodulation network. Each digital demodulation network is disposed to demodulate the signal provided to it in accordance with the way in which the signal was modulated, which in the preferred embodiment comprises frequency modulation (FM). Following demodulation, data or voice information is extracted from each channel and placed in the PCM format required for transmission over a standard T1 line. In the preferred embodiment this involves performance of the following operations: (i) high pass filtering, (ii) decimation, (iii) expansion, and (iv) de-emphasis filtering. These processing steps are further described hereinafter. The net result of these operations is the production of a standard 8-bit "DS0" signal clocked at 8 KHz, hereinafter simply referred to as a DS0 signal.

As is well known, each AMPS frequency channel inherent within the incident frequency-multiplexed r.f. signal has impressed thereon a Supervisory Audio Tone (SAT) signal. Accordingly, each of the K demodulation networks within each DRX module 28 is also configured to process the SAT signal associated with each frequency channel.

Referring to FIG. 1, the DS0 signal produced by each of the K demodulation networks within each of the M DRX modules 28 is inserted into an assigned time slot on a TDM receive bus 32a. In the embodiment of FIG. 1, the TDM receive bus 32a and a TDM transmit bus 32b together comprise a bidirectional data bus equivalent to a VXIbus Trigger Bus, which is described in VXI Specification, IEEE Standard 1155. As is indicated by FIG. 1, both the TDM receive bus 32a and the TDM transmit bus 32b are coupled to a base station controller (BSC) module 36.

The BSC module 36 operates as a system controller and provides an interface for the base station 10 to a mobile switching center (MSC) via a plurality of T1 trunk lines 40. In the exemplary embodiment a set of eight T1 trunk lines 40, each having 24 time slots, provide the capacity for up to 192 full-duplex voice links to be established between the base station 10 and the MSC (not shown). In what follows, terms such as "voice link," "voice signal" and "voice information" are intended to refer not only to speech information, but also to data and the like transmitted over the T1 trunk lines. In order to support the set of 192 voice links at a nominal 64 Kbps rate, both the TDM receive bus 32a and the TDM transmit bus 32b are clocked at an exemplary rate of 12.288 Mbps (i.e., 192×64 Kpbs). In alternate implementations, a set of six E1 lines may be used in lieu of the eight T1 trunk lines 40 coupled to the BSC 36.

III. The Base Station Controller (BSC)

Figure 2:
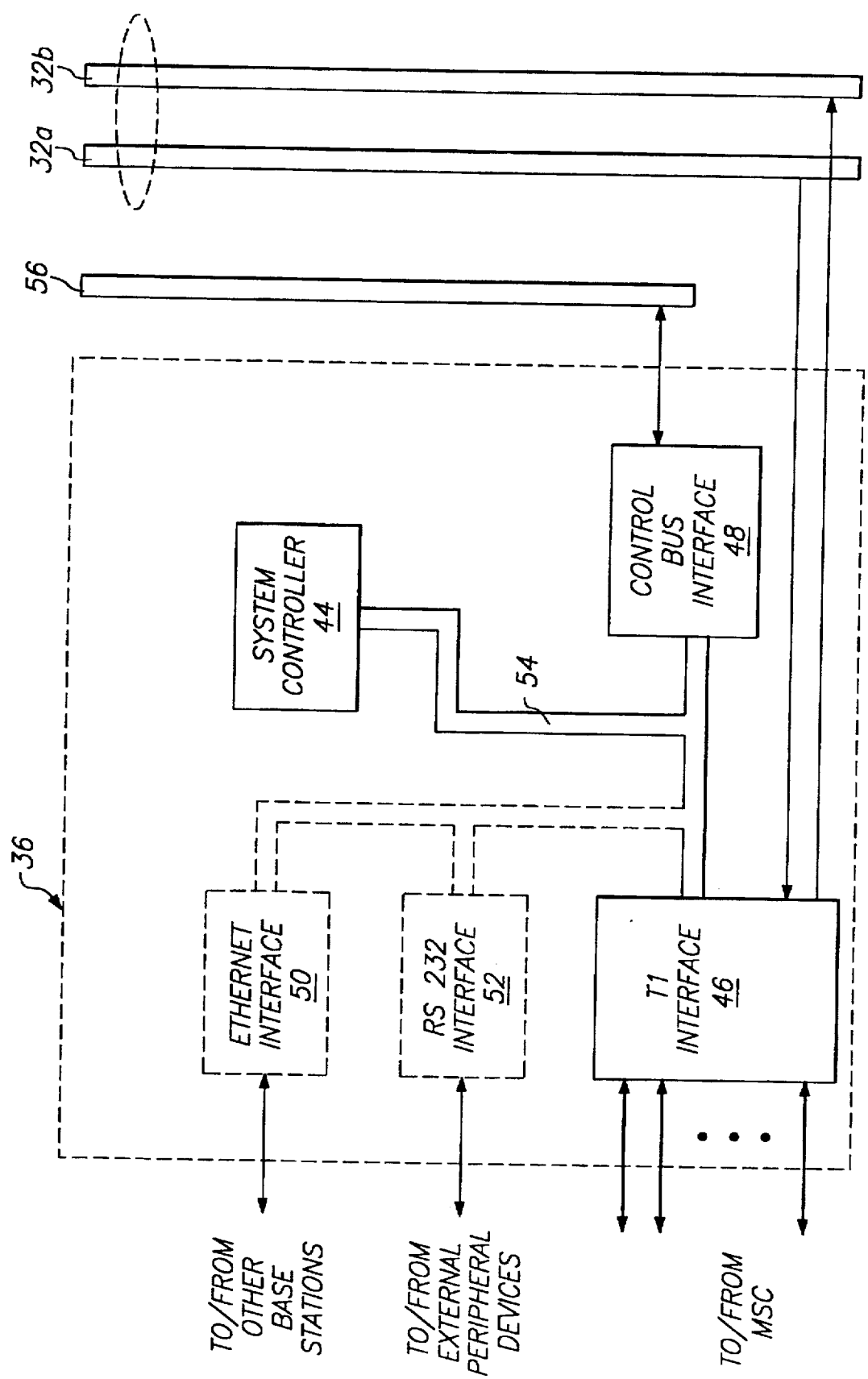
FIG. 2 provides a block diagram representation of a base station controller (BSC) included within the inventive base station.

FIG. 2 provides a block diagram representation of the base station controller (BSC) 36. The BSC 36 includes a system controller 44, which typically includes a 680EC40 μP together with standard RAM and ROM memory capability. The system controller 44 is linked to a T1 interface module 46, a control bus interface 48, and optionally to an Ethernet interface 50 and RS-232 interface 52 via an internal control bus 54. The control bus interface 48 enables data to be transferred between the internal control bus 54 and a VXI control bus 56. In the embodiment of FIG. 2 the internal control bus 54 comprises a 32-bit 68040 data bus, and the VXI control bus 56 is of the type specified by IEEE Std 1155.

The Ethernet interface 50 is designed to support communication with other base stations over an Ethernet cable or the equivalent, and may be realized in compliance with Ethernet version 2, IEEE 802.3 10BaseT by using an AMD799X LANCE chip set. Similarly, the RS 232 interface 52 facilitates external monitoring and performance of diagnostics, and may also serve as a conduit through which software is downloaded to the system controller 44.

Figure 3:
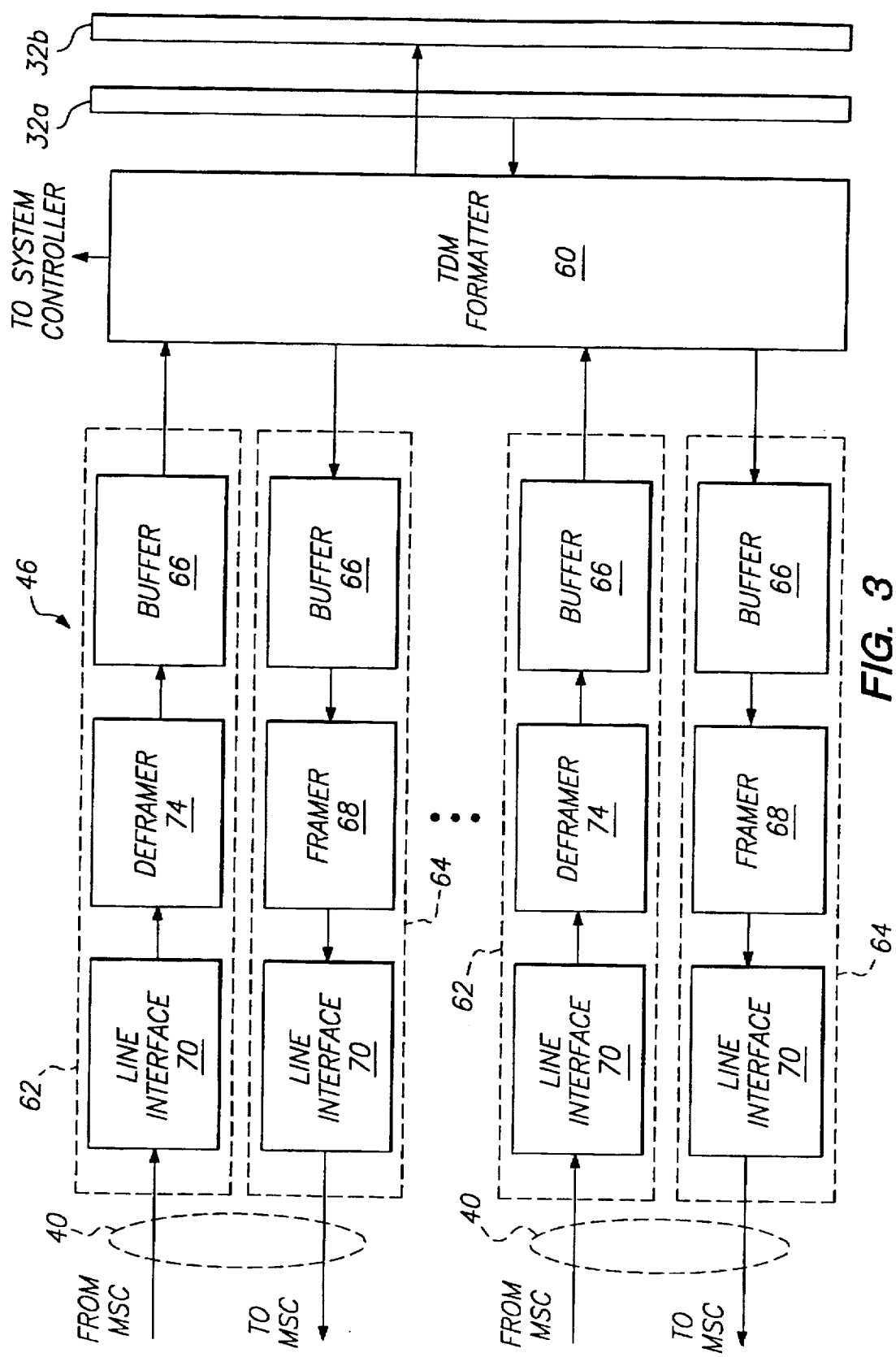
FIG. 3 shows a block diagram of a T1 interface module incorporated within the BSC.

Turning now to FIG. 3, a block diagram is shown of the T1 interface module 46. The T1 interface module 46 includes a TDM formatter 60 operative to de-multiplex the 192 time slots, carried at the exemplary rate of 12.288 Mbps by the TDM receive bus 32a, among a set of eight T1 outgoing interface paths 62. Similarly, the TDM formatter 60 also serves to multiplex the incident voice information from eight incoming T1 interface paths 64 into a 12.288 Mbps serial stream for insertion upon the TDM transmit bus 32b.

Each T1 outgoing interface path 62 includes an elastic buffer 66 designed to absorb differences in frequency and phase between the TDM transmit bus 32b and the outgoing T1 voice and control information. The outgoing T1 voice and control information within each buffer 66 is framed within a standard T1 framer circuit 68, which places the outgoing T1 voice and control information in the frame format required for transmission over the T1 lines 40. As is indicated by FIG. 3, each full-duplex T1 line 40 is coupled to the BSC 46 through a pair of standard trunk line interface circuits 70.

Considering now the eight incoming T1 interface paths 62 within the base station BSC 46, voice information from the incoming portion of each full-duplex T1 line is passed by one of the interface circuits 70 to a conventional deframer circuit 74. Each incident stream of T1 voice information is deframed within one of the deframer circuits 74, and is provided to one of the elastic buffers 66. The elastic buffer 66 at the output of each deframer circuit 74 is designed to absorb differences in frequency and phase between the incident T1 voice information and the TDM transit bus 32b.

IV. Transmit (TX) Mode Operation

Referring again to FIG. 1, the TDM transmit bus 32b provides the 12.288 Mbps multiplexed data stream from the TDM formatter 60 (FIG. 3) to each of a set of M digital transmit (DTX) modules 80. Each of the M DTX digital transmit modules 80 include a set of K DTX channel modules (not shown in FIG. 1), each of which processes the voice signal within one of the time slots of the TDM transmit bus 32b. In particular, each DTX channel module is disposed to FM modulate a digital baseband carrier with its assigned stream of voice information. In the exemplary AMPS embodiment, a digital Supervisory Audio Tone (SAT) signal of either 5970, 6000 or 6030 Hz is injected into each stream of DS0 voice data after FM modulation.

After the injection of a digital SAT tone into a given stream of DS0 voice data, the following steps are performed to effect FM modulation: (i) high-pass filtering, (ii) compression, (iii) pre-emphasis filtering, (iv) signal limiting, (v) interpolating, and (vi) low-pass filtering. The modulated signal stream is then again interpolated to an exemplary sample rate of 30.72 Msps, and is tuned to an assigned baseband frequency.

Each K DTX channel module within a given DTX digital transmit module 80 sums its IF signal with those of the preceding DTX channel modules. At the output of the $K^{th}$ DTX channel module within each DTX transmit module 80, the signals from each of the K DTX channel modules therein are added to a wideband local transmit bus 84. The wideband local transmit bus 84 then proceeds to the next DTX module 80, which similarly adds thereto the signals from its K DTX channel modules. Once the last of the M DTX channel modules (i.e., the DTX channel module 80') has added its K signals to the wideband local transmit bus 84, the bus 84 is routed to the WBTX section 18 of the wideband transceiver module.

The WBTX section 18 includes a 16-bit digital to analog converter (DAC) operative to convert the 30.72 Msps digital data stream from the wideband local transmit bus 84 into an analog baseband signal. The frequency of the analog baseband signal is first translated to an intermediate frequency (IF), and is then further up-converted to an r.f. frequency band (e.g., 880 to 894 MHz). The resultant r.f. signal is provided via the antenna interface unit 20 to the antenna system 12, which radiates the r.f. signal to mobile users within the coverage area of the base station 10.

V. The DTX Modules

Figure 4:
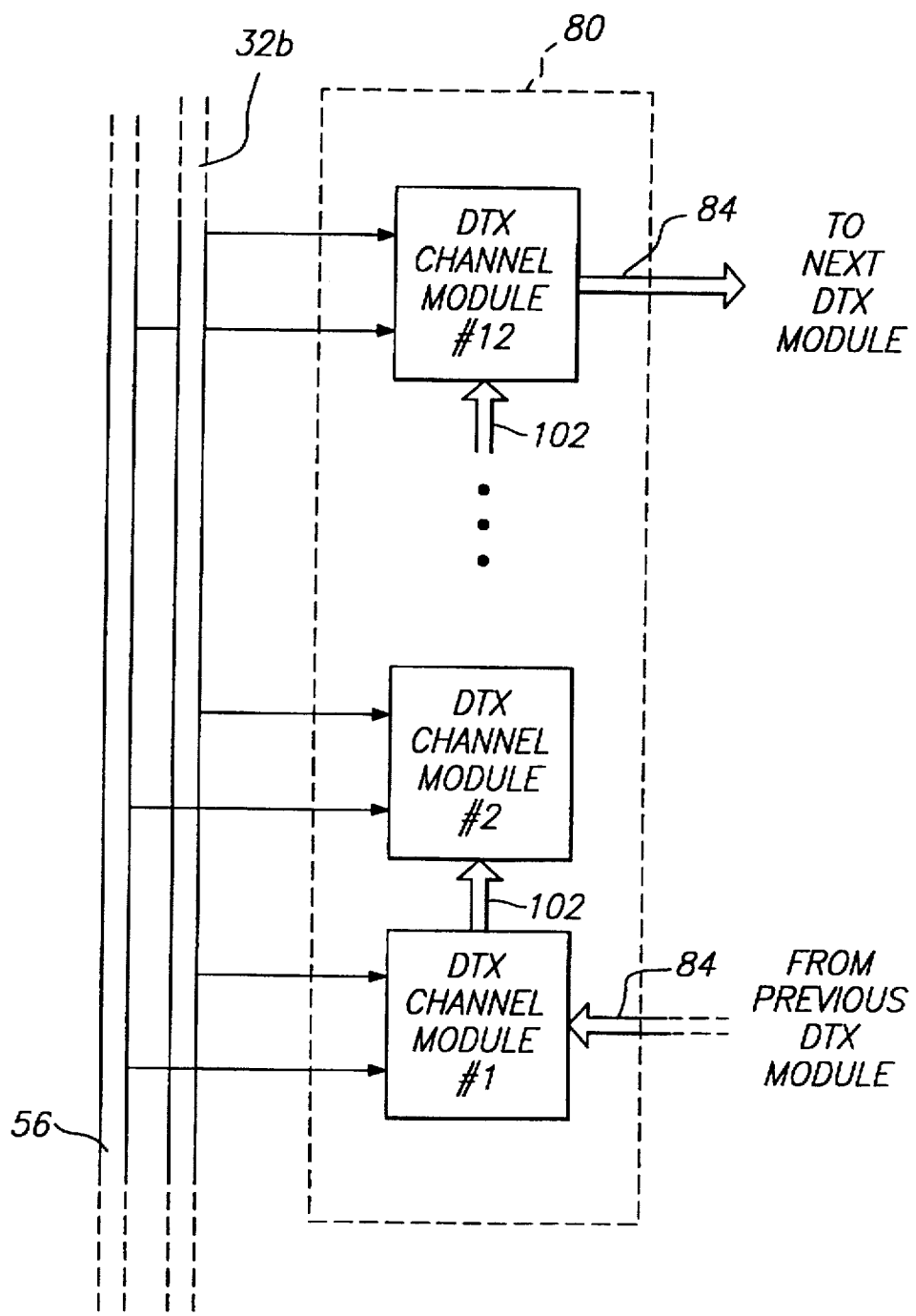
FIG. 4 depicts the internal structure of an exemplary digital transmit (DTX) module comprised of a plurality of DTX channel modules.

Referring to FIG. 4, the internal structure of an exemplary DTX module 80 is illustrated in further detail. In FIG. 4, the DTX module shown includes a set of twelve DTX channel modules (i.e., K=12), the first of which is provided with the local transmit bus 84 from the previous DTX module. Each of the twelve DTX channel modules receives control instructions from the VXI control bus 56, including an assignment to process the voice information carried by a particular one of the 192 TDM time slots of the TDM transmit bus 32b. In addition, the VXI control bus 56 also instructs each DTX channel module to output processed voice information on a unique digital baseband frequency.

After the first DTX channel module (DTX channel module #1) processes the voice signal from its assigned time slot and adds it to the local transmit bus 84, the result is provided to the second DTX channel module via an internal DTX wideband data bus 102. Next, the second DTX channel module adds the voice signal information which it has processed to the wideband data bus 102, and the result is provided by the wideband data bus 102 to the third DTX channel module. This is repeated until DTX channel module #12 has added its processed voice signal to the wideband data bus 102, and the result forwarded to the next DTX module 80 over the local transmit bus 84.

Figure 5:
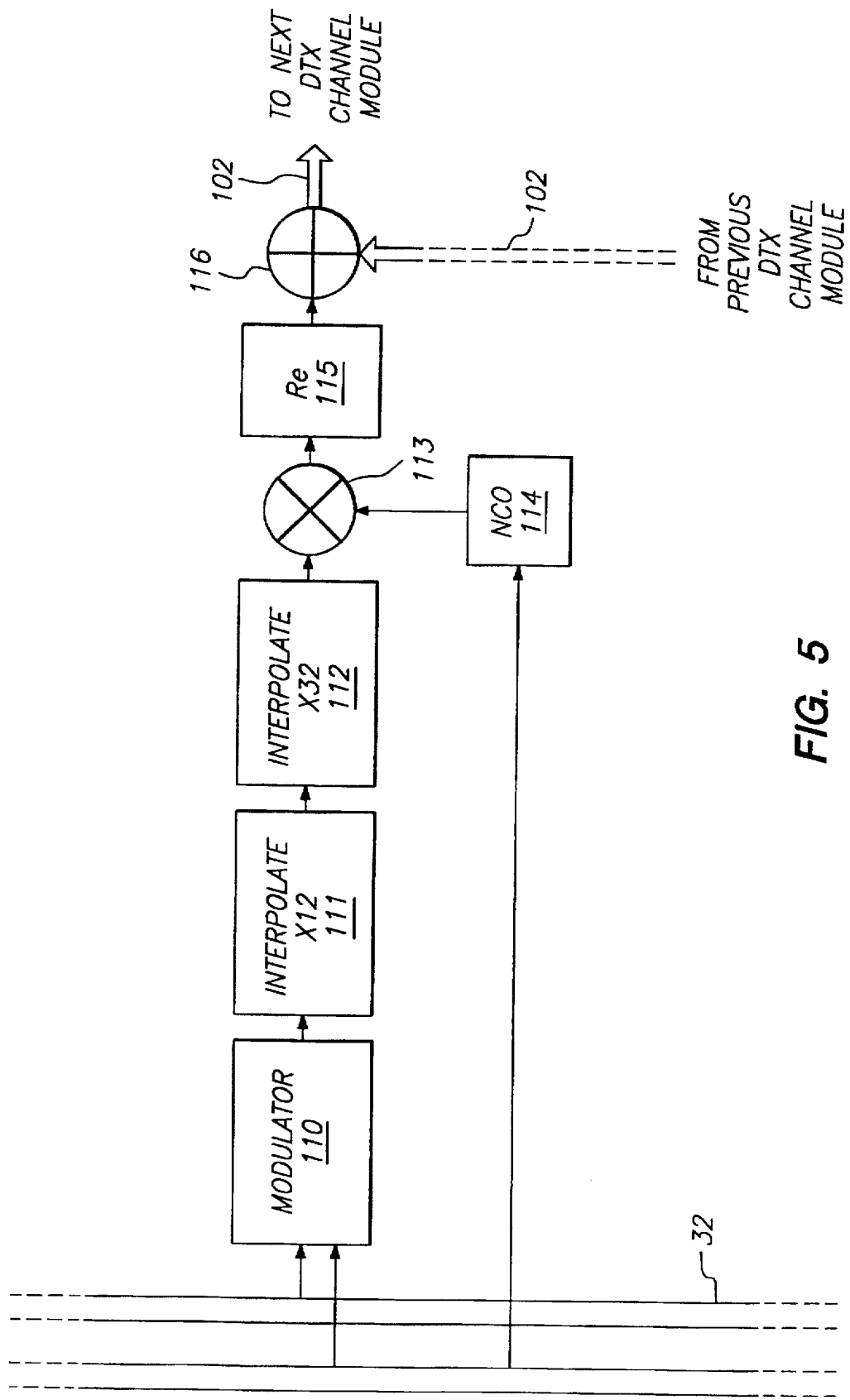
FIG. 5 provides a block diagram of a single DTX channel module disposed to process the voice signal within an assigned time slot of a TDM transmit bus.

Turning now to FIG. 5, a block diagram is provided of a single DTX channel module disposed to process the voice signal within an assigned TDM time slot on the TDM transmit bus 32b. The DTX channel module includes a DTX channel modulator 110 which operates differently depending upon whether the DTX channel module has been assigned to process a forward voice channel (FOVC), or a forward control channel (FOCC). For FOVC processing, voice information from an assigned TDM time slot is processed for transmission unless a mobile station control word is received from the BSC 36 over the control bus 56. In this case, normal voice processing is briefly interrupted to allow processing of the control word. When a DTX channel module has been instead assigned to perform FOCC processing, various mobile station control messages are continuously sent to the exclusion of voice information.

The modulated information produced by the DTX channel modulator 110 is interpolated by the exemplary factors of twelve and thirty-two within x12 and x32 interpolaters 111 and 112, respectively. The interpolated data stream is up-converted to a unique digital frequency by mixer 113, which receives a local oscillator signal of the necessary frequency from numerically controlled oscillator (NCO) 114. After the real part of the frequency-unconverted signal from mixer 113 is extracted 115, the result is added to the wideband data bus 102 by a 2-channel adder 116.

The wideband data bus 102 and the plurality of 2-channel adders 116 may be characterized as a wideband summation network, since these elements combine the signals from each DTX channel module into a frequency-multiplexed signal carried by the local transmit bus 84. This obviates the need to provide one or more relatively complex, multi-channel adders as a means of furnishing the frequency-multiplexed signal.

Figure 6:
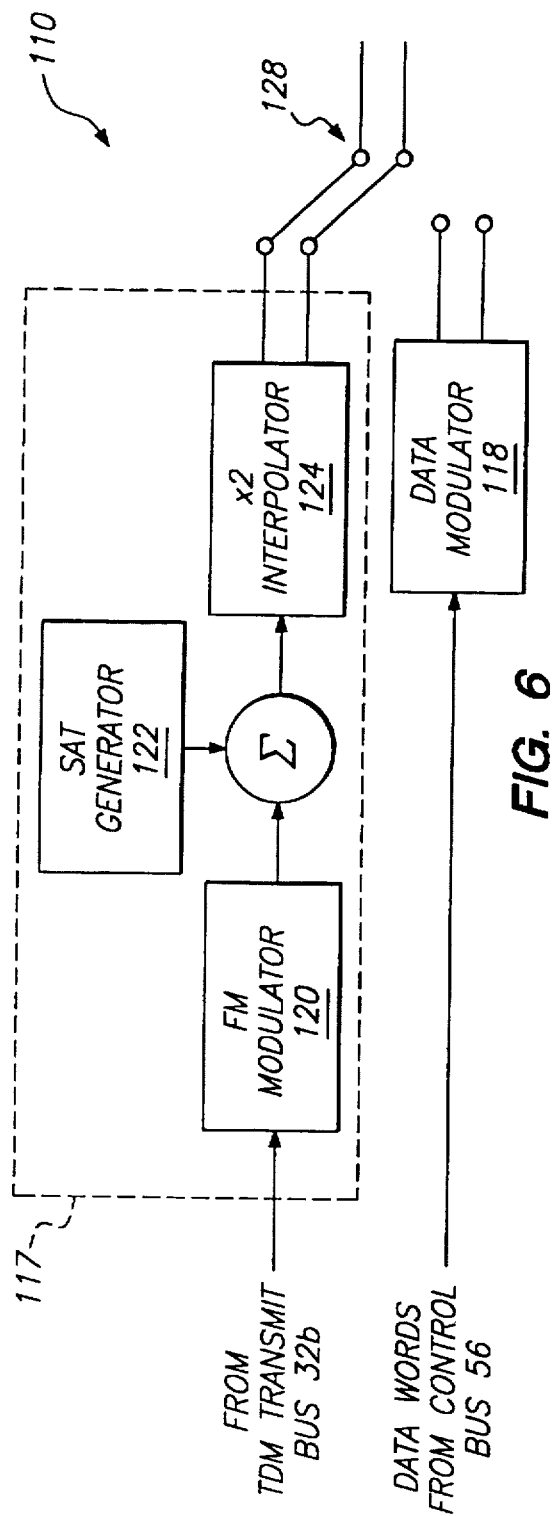
FIG. 6 provides a top-level diagram representative of signal flow through a DTX channel modulator.

FIG. 6 provides a top-level diagram representative of signal flow through the DTX channel modulator 110. The DTX channel modulator 110 includes a voice modulator 117 and a digital data modulator 118. The voice modulator 117 includes an FM modulator 120, an SAT signal generator 122, and a x2 interpolater 124. When the DTX channel modulator 110 is performing FOVC processing, switch 128 selects the modulated voice information from voice modulator 117. Similarly, the switch 128 is set to receive modulated data from a data modulator 118 when FOCC processing is being carried out. In either case, the result is a digital frequency-modulated (FM) signal comprised of an in-phase/ quadrature-phase (I,Q) modulated zero Hz carrier.

Voice data is received in PCM format by the FM modulator 120 from an assigned time slot of the TDM transmit bus 32. The FM modulator 120 performs µ-Law expansion of the PCM data from 8 to 14 bits, and then effects 2:1 syllabic compression. The compressed voice data is then interpolated to an exemplary sample rate of 40 Ksps, and passed through a pre-emphasis filter having a transfer function +6 dB/octave between 300 and 3000 Hz. The output of the pre-emphasis filter is hard-limited on a sample-by-sample basis to the extent required to achieve a desired modulation index, and is then passed through a low-pass filter. After integration, the voice data is combined with an SAT signal provided by the SAT generator. The combined signal is phase modulated to complete the frequency modulation (FM) process, and the result passed through the x2 interpolater 124 to the switch 128.

Figure 7:
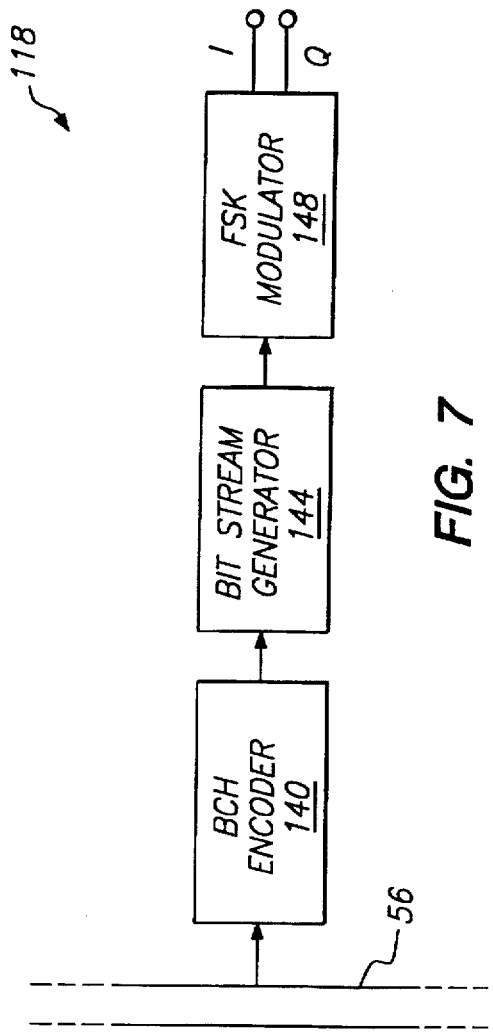
FIG. 7 is a block diagrammatic representation of a digital data modulator included within the DTX channel modulator.

FIG. 7 is a block diagrammatic representation of the digital data modulator 118. In an exemplary embodiment the digital data modulator 118 includes a BCH encoder 140, to which 28-bit binary control words are supplied at a rate of 10 Kbps from the control bus 56. Each such message is provided by the BSC 36 via control bus 56 in a format substantially similar to that specified by TIA/EIA Standard 553. Within the BCH encoder 140 each 28-bit message word is zero-padded (e.g., with 12 zeros), and is then converted into a 40-bit message code in accordance with a predefined BCH generating polynomial. The resultant 40-bit encoded (i.e., scrambled) messages are provided to a bit stream generator 144, which for each scrambled message produces a bit stream comprised of a sequence of blocks. Combinations of blocks are formed and concatenated differently depending upon whether it is desired to effect transmission over a forward control channel (FOCC) or a forward voice channel (FOVC).

During transmission over a FOVC, normal voice transmission is interrupted for an exemplary 103.1 ms period each time that the digital data modulator 118 receives a control message from the BSC 36 for transmission to a mobile unit. In order to support FOVC transmission, the bit stream generator 144 produces a concatenated sequence of FOVC blocks wherein each FOVC block includes a scrambled 40-bit control message and a preamble. The preamble includes a dot sequence and word synchronization pattern, and effectively separates each repetition of the scrambled message. In an exemplary embodiment the bit stream generator 144 creates, for each scrambled message to be transmitted over a FOVC, a bit stream of 1031 bits comprised of eleven FOVC blocks.

When the digital data modulator 118 is used to support a FOCC, the bit stream generator 144 produces a filler message except when either an overhead or control message is being generated. Overhead messages are sent at a regular rate (e.g., every 0.8±0.3 seconds), and control messages sent asynchronously over each FOCC as necessary. Upon receiving an encoded (i.e., scrambled) control message from the BCH encoder 140, the bit stream generator 144 produces a single FOCC block comprised of a preamble, word synchronization sequence, and the scrambled control message.

During operation of the digital data modulator 118 in both FOVC and FOCC processing modes, each FOVC or FOCC block from the bit stream generator 144 is provided at an exemplary 10 Kbps rate to an FSK modulator 148. Although capable of being implemented as a purely digital circuit, the FSK modulator 148 may be characterized as a look-up table disposed to create a Manchester-encoded analog waveform which is subsequently sampled at a 40 KHz rate. Specifically, a set of functions similar to the following will typically be performed upon the incident 10 Kbps bit stream: (i) Mancheqter encoding, (ii) integration, (iii) low-pass filtering (iv) phase modulation, and (v) further low-pass filtering to achieve smoothing. Upon sampling at 40 Hz, four (I,Q) pairs for each bit of the incident 10 Kbps stream are produced in order to generate an output sequence corresponding to a digital FSK-modulated waveform of predetermined frequency deviation (e.g., ±8 KHz). In a practical implementation, the FSK modulator 148 may be realized using a table look-up system in which the values of each set of four (I,Q) pairs is determined in accordance with the values of the current and a set of the most recent bits within the incident 10 Kbps sequence.

VI. Wideband Transmitter (WBTX) Section of the Wideband Transceiver Module

Figure 8:
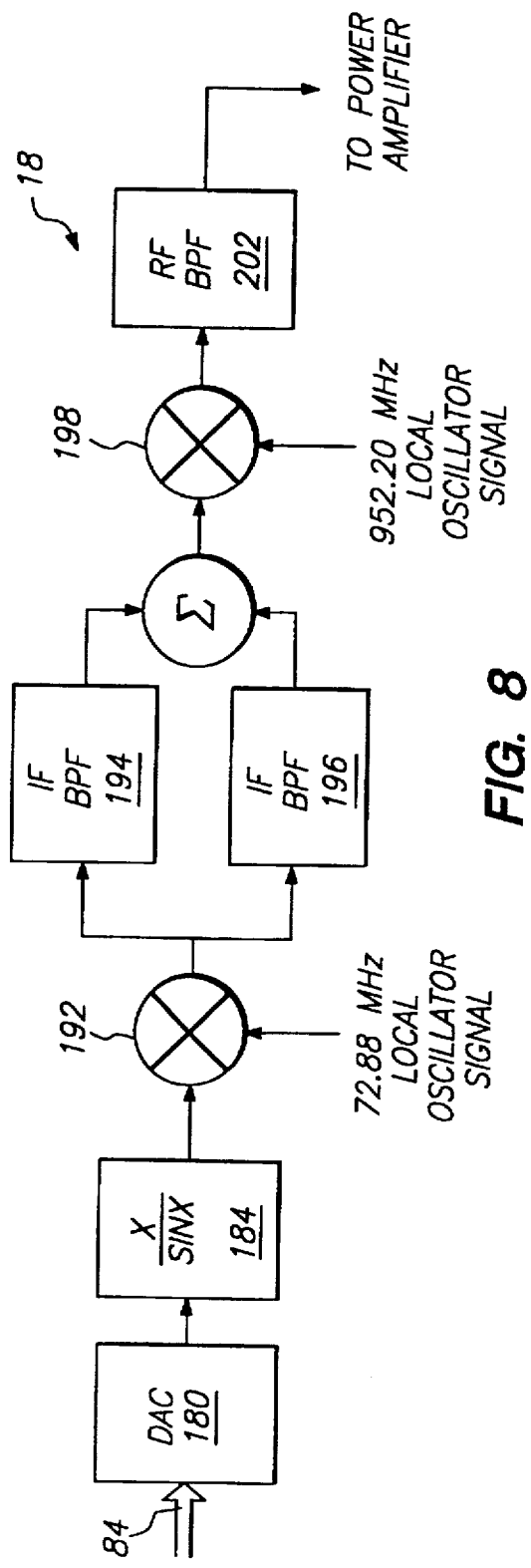
FIG. 8 depicts the manner in which a wideband transmitter (WBTX) section of a wideband transceiver module operates to convert the high-speed digital data stream from a local transmit bus into an r.f. signal for broadcast by an antenna.

Turning now to FIG. 8, the WBTX 18 operates to convert the high-speed digital data stream from the local transmit bus 84 into an r.f. signal for provision to a power amplifier (not shown) and subsequent broadcast by antenna system 12. The specific frequency values specified in FIG. 8 result in creation of an FCC-specified B-band r.f. waveform, it being understood that transmission over other r.f. bands may be performed using substantially the same architecture.

The high-speed (30.72 Msps) data stream from the local transmit bus 84 is initially processed by a digital to analog converter (DAC) 180. If the DAC 180 is not realized to oversample the incident 30.72 Msps signal, an X/SIN(X) filter network 184 is employed to provide the requisite compensation. A first mixer 192 up-converts the baseband frequency using a 72.88 MHz local oscillator signal, and the combined signal applied to first and second intermediate frequency bandpass (IF) amplifiers 194 and 196. The first and second bandpass IF amplifiers 194 and 196 provide amplification over the IF bands 62.20 to 72.2 MHz, and 58.20 MHz to 60.70 MHz, respectively. The resultant amplified IF signals are combined, unconverted to the r.f. frequency band within r.f. mixer 198, and passed through an r.f. BPF 202 having a bandwidth extending from 880 to 890 MHz, and from 891.4 MHz to 894 MHz.

VII. Wideband Receiver (WBRX) Section of the Wideband Transceiver Module

Figure 9:
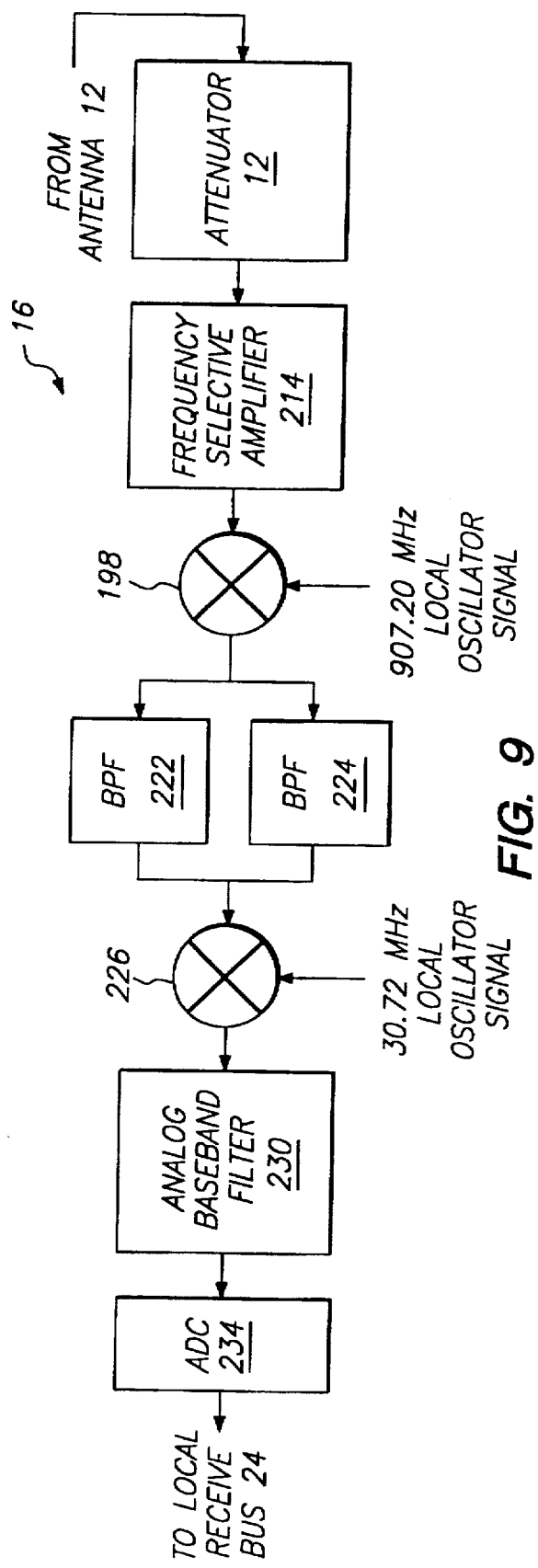
FIG. 9 illustrates a wideband receive (WBRX) section of a wideband transceiver module.

Referring to FIG. 9, the WBRX section 16 operates upon the incident r.f. signal collected by antenna system 12 from one or more mobile units (not shown). In particular, the WBRX converts the incident r.f. signal into a high-speed digital data stream for insertion onto the high-speed local receive bus 24. The incident r.f. signal (e.g., 835 to 849 MHz) is, if necessary for automatic gain control, attenuated by attenuator 210. A frequency selective amplifier network 214 provides gain over the active regions of the B-band (i.e., from 835 MHz to 845 MHz, and from 846.5 MHz to 849 MHz). An r.f. down-converting mixer 218, coupled to the output of the frequency selective amplifier network 214, serves to mix the received signal down to within an IF band extending from 58.6 to 72.2 MHz. Due to the 1.5 MHz gap in the B-band, the resultant IF signal is split and separately filtered by a first and by a second IF bandpass filter (BPF) 222 and 224. The first and second IF BPFs 222 and 224 provide filtering over the IF bands 62.20 to 72.2 MHz, and 58.20 MHz to 60.70 MHz, respectively.

The filtered IF signals from the first and second IF BPFs 222 and 224 are then combined, and jointly provided to an IF mixer 226. The IF mixer 226 translates the frequency of the combined IF signal to analog baseband for filtering by an analog lowpass and notch filter 230. The filtered analog baseband signal is sampled by analog to digital converter (ADC) 234, and the resultant wideband digital data stream provided to the high-speed local receive bus 24.

VIII. DRX Modules

Figure 10:
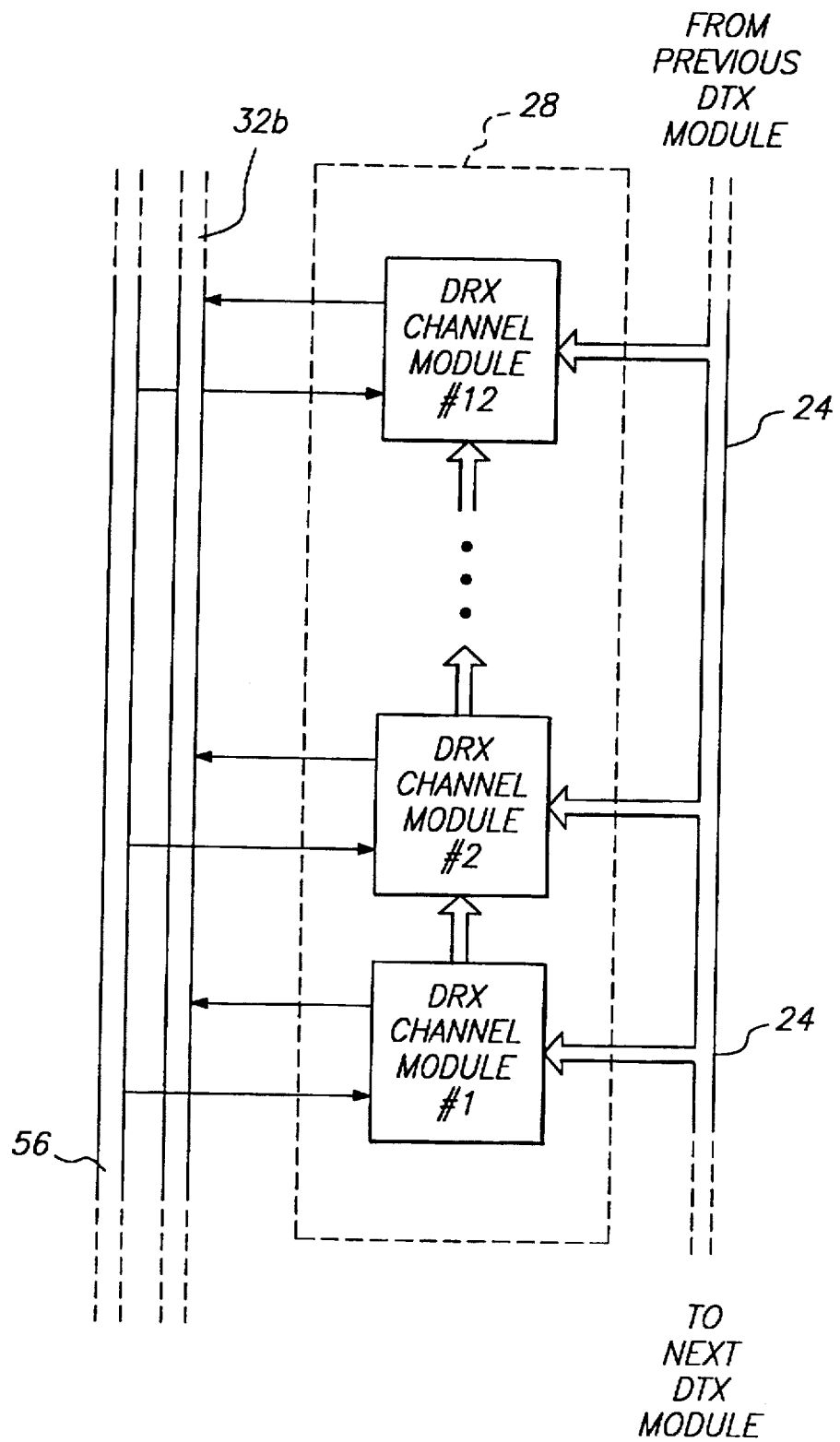
FIG. 10 shows the internal organization of an exemplary digital receive (DRX) module.

Referring to FIG. 10, the internal organization of an exemplary DRX module 28 is illustrated in further detail. In FIG. 10, the DRX module 28 is seen to include a set of twelve DRX channel modules (i.e., K=12), each of which has access to the local receive bus 24. Each of the twelve DRX channel modules receives control instructions from the VXI control bus 56, including an assignment to process the information carried by a particular received frequency channel. After processing the information carried by its assigned frequency channel, each DRX channel module inserts the processed information into an associated one of the 192 TDM time slots of the TDM receive bus 32a. This operation is replicated within each DRX module 28, with the result that each of the frequency signals inherent within the frequency-multiplexed signal carried by the local receive bus 24 is processed by a different DRX channel module and subsequently inserted into an assigned time slot of the TDM receive bus 32a.

As mentioned above, in alternate embodiments the antenna system 12 may be implemented as three or more distinct sector antennas for independently servicing different cell sectors. In yet other alternate embodiments, pairs of sectored antennas are deployed in each sector as a means of facilitating spectral diversity reception of signals from mobile units within the sector. In accordance with one aspect of the invention, the signal energy received from each such sector antenna, or from each individual diversity sector antennas, is assigned to a specific time slot on the local receive bus 24. For example, in an embodiment in which a pair of diversity sector antennas are deployed for each of three cell sectors (i.e., six separate antennas), the local receive bus 24 would be time-division multiplexed into six time slots. Since the local receive bus 24 is made available to each of the K DRX receive channel modules within each DRX module 28, any frequency channel received by any one of the diversity sector antennas could be processed by any one of the DRX receive channel modules.

In such diversity applications, a diversity link 250 (FIG. 10) is optionally provided between adjacent DRX channel modules. As an example, consider the case in which DRX channel module #1 and DRX channel module #2 (FIG. 10) are assigned to process the same frequency channel received by first and second diversity antennas assigned to service a given cell sector. In this case DRX channel module #1 and DRX channel module #2 would extract the same frequency channel from the different time slots of the local receive bus 24 respectively assigned to the first and second diversity antennas. The quality of the different frequency channels processed by DRX channel module #1 and DRX channel module #2 could then be compared by exchanging signal quality information over the diversity link 250. The higher quality received signal would then be inserted, after processing by either DRX channel module #1 or DRX channel module #2, into the appropriate time slot of the TDM receive bus 32a.

Figure 11:
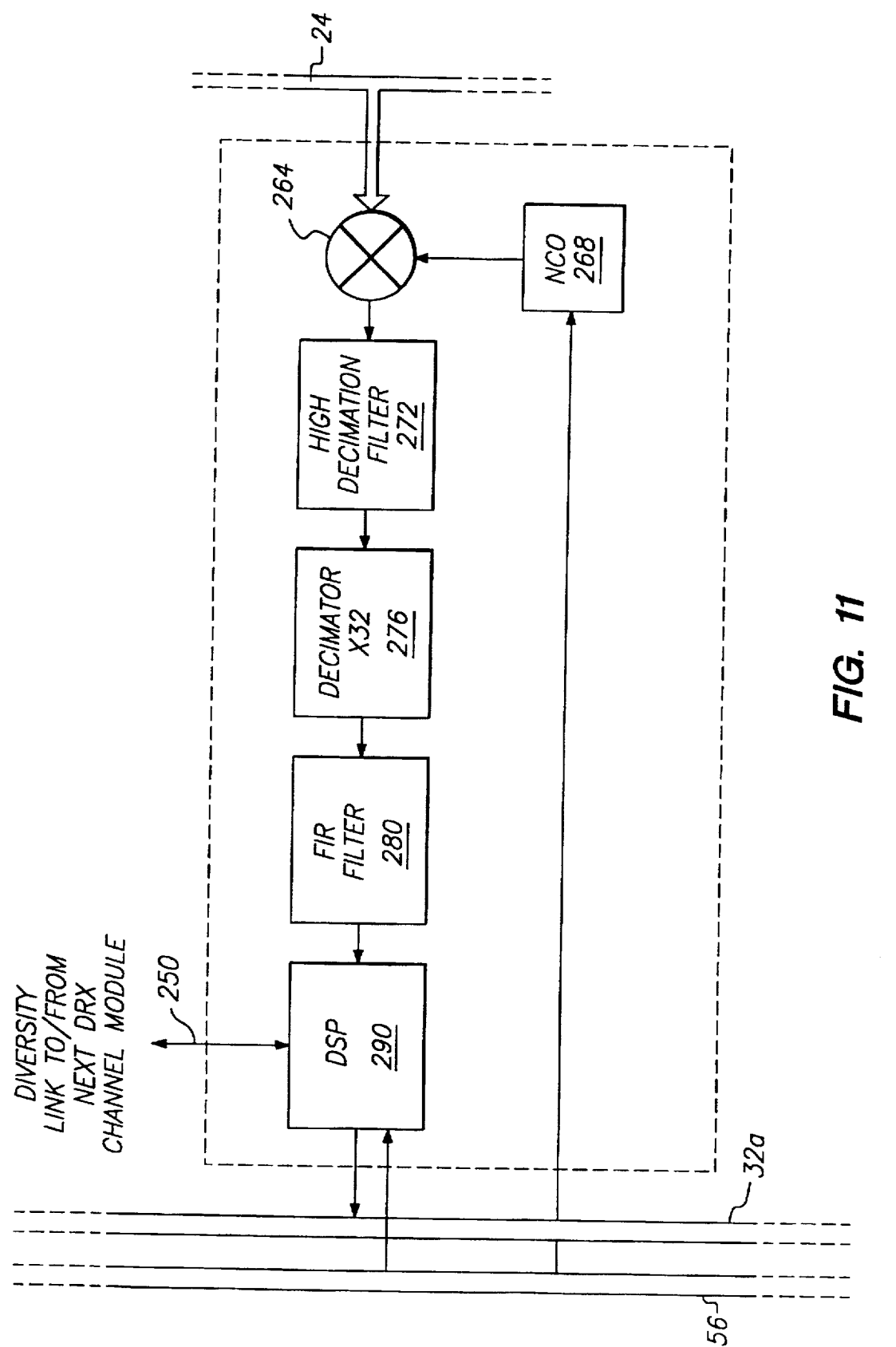
FIG. 11 is a block diagram of a single DRX channel module operative to process an assigned frequency channel.

Turning now to FIG. 11, a block diagram is provided of a single DRX channel module disposed to process an assigned frequency channel from a particular time slot of the local receive bus 24. The wideband, 30.72 Msps digital signal from the local receive bus 24 is applied to a digital tuner 260, which is controlled by the BSC 36. In particular, the BSC 36 instructs the digital tuner 260 via control bus 56 to extract, from a particular time slot of the local receive bus 24, the signal at an assigned frequency. The digital tuner 260 is functionally represented as including a mixer 264, numerically-controlled oscillator (NCO) 268, high-decimation filter 272, decimator 276, and FIR filter 280. The digital tuner may be implemented using, for example, a GC1011A digital tuner from GrayChip of Palo Alto, Calif. In the exemplary embodiment the digital tuner 260 produces a complex-valued output stream over in-phase (I) and quadrature-phase (Q) channels, each of which runs at 80 Ksps with 16-bit resolution.

The DRX channel module of FIG. 11 further includes a digital signal processor (DSP) 290 programmed to demodulate the 80 Ksps complex (I,Q) output stream from the digital tuner 260. Since each DRX channel module supports either a reverse voice channel (RVC) or a reverse control channel RCC, each DSP 290 is configured to process either the received voice or data information. In both cases an FM demodulation operation is initially performed upon the received information, at which point the FM-demodulated information is subjected to either voice processing or data extraction. When the DSP 290 has been programmed for data extraction, the FM-demodulated information is decoded in a manner dependent upon the operation originally used to encode the data. With respect to voice channels, the DSP 290 is disposed to perform SAT and ST tone detection, as well as voice processing of the type specified by the EIA/TIA standard 553.

Figure 12:
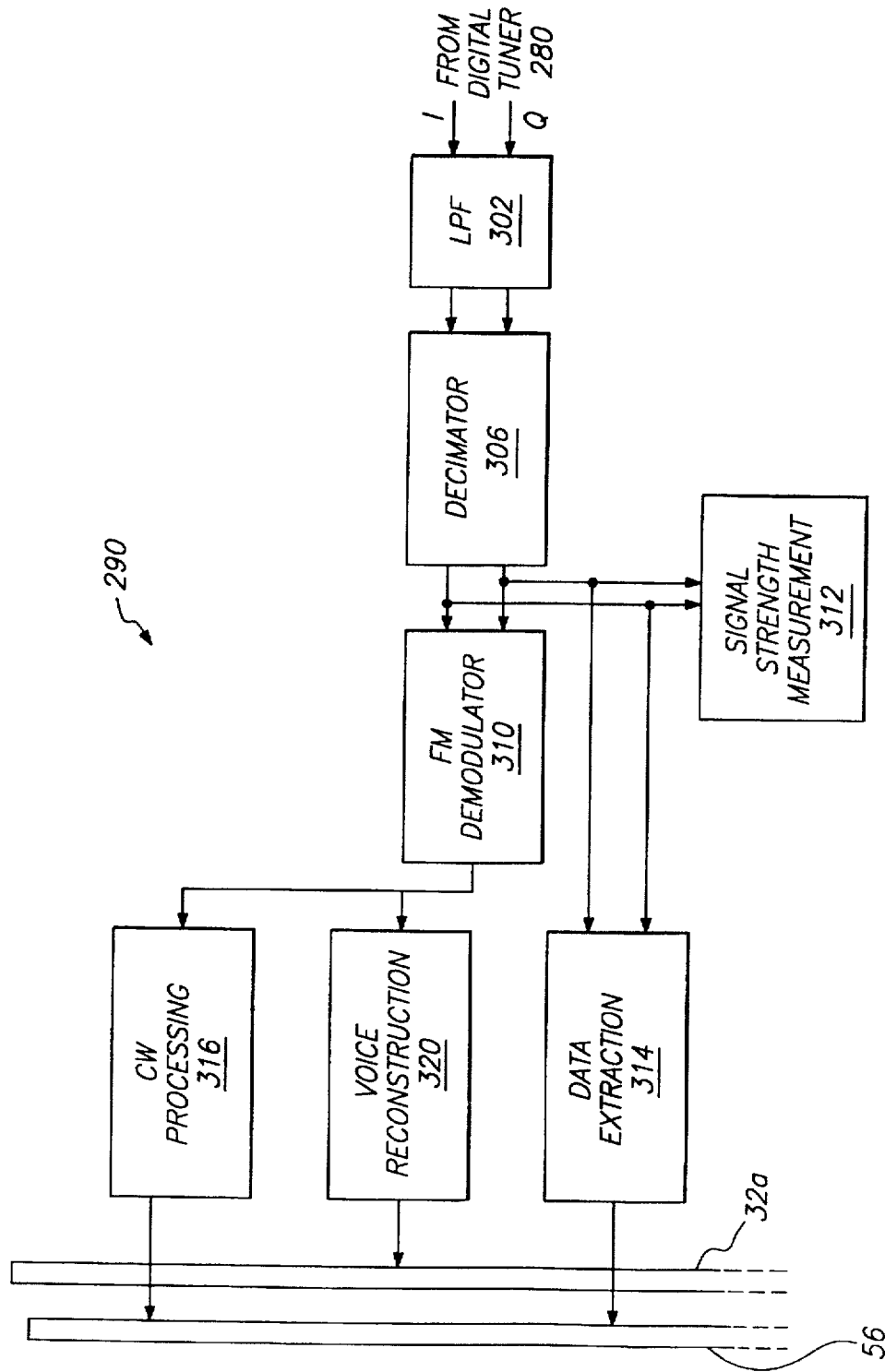
FIG. 12 illustratively represents the functional organization of a DRX channel demodulator.

Referring to FIG. 12, a representation is provided of an exemplary manner in which the DSP 290 may be functionally organized. The 80 Ksps (I,Q) data produced by the digital tuner 280 is seen to be applied to a lowpass filter (LPF) 302, the output of which is decimated by a factor of two within decimator 306. The resultant 40 Ksps complex data stream is provided to an FM demodulator 310, to a signal strength measurement circuit 312, and to a data extraction circuit 314. In the exemplary embodiment the signal strength measurement circuit 312 performs a signal strength measurement operation once every second by (i) decimating the 40 Ksps stream by a factor of 40, (ii) squaring the I and Q component of each sample of the decimated stream, and (iii) summing 1000 pairs of squared I and Q samples once each second.

The FM demodulator 310 operates to demodulate the sampled FM signal comprising the sequence of (I,Q) sample pairs received from the decimator 306 by performing the following operations: (i) determining an angle $\tan^{-1}(I/Q)$ for each (I,Q) sample pair, and (ii) time-differentiating the resulting series of angles. The time-differentiation function may be approximated by taking the difference between successive angles, since the exemplary 40 KHz sample rate greatly exceeds the 3 KHz voice bandwidth.

Again referring to FIG. 12, the demodulated 40 Ksps output produced by the FM demodulator 310 is applied to a continuous wave (CW) processing network 316, and to a voice reconstruction network 320. If the channel demodulated by the FM demodulator constitutes a reverse control channel (RCC), then processing takes place within the data extraction network 314 and DOT sequence detection occurs within the CW processing network 316. For a reverse voice channel (RVC), both the data extraction and voice reconstruction networks 314 and 320 are operative. In addition, the CW processing network 316 detects the DOT sequence, SAT signal, and ST tone associated with the RVC.

Subsequent to FM demodulation, processing of information received from a mobile unit over an RCC alternates between two states: (i) DOT sequence detection, and (ii) data extraction. Each RVC is processed similarly, but during state (i) the operations of voice reconstruction, as well as of SAT and ST signal detection are also performed. In each instance state (i) continues until a DOT sequence is detected, at which time SAT/ST detection and voice reconstruction are suspended. Data extraction then occurs until extraction of the last word in the received block, or alternately until the occurrence of a time-out condition. Operation in state (i) then resumes.

Figure 13:
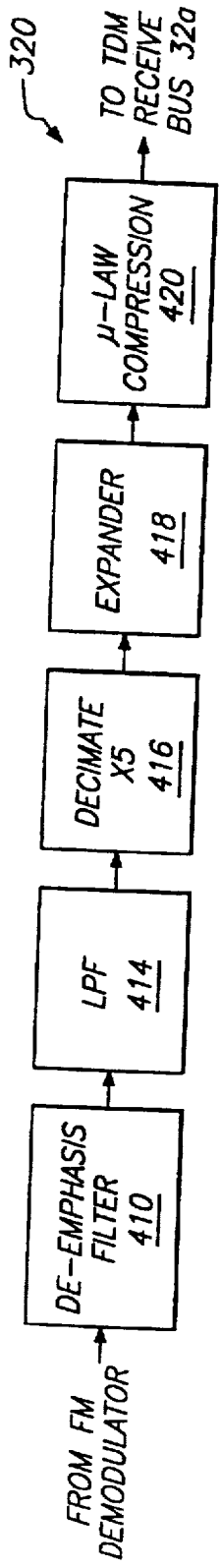
FIG. 13 provides a representation of the signal processing functions performed within a voice reconstruction network of a DRX channel module.

Turning now to FIG. 13, a block diagram is shown which is representative of the signal processing functions performed within the voice reconstruction network 320. The demodulated voice information from the FM demodulator 310 is applied to a de-emphasis filter 410, which exhibits approximately 6 dB/octave roll-off between 300 and 3,000 Hz. The de-emphasis filter 410 is followed by a lowpass filter (LPF) 414, which is characterized by a 0 dB passband from 0 to 3 KHz and by a stopband providing 40 dB of attenuation from 5 to 20 KHz. The filtered 8-bit samples from the LPF 414 are then passed through a decimation stage 416 designed to reduce the sample rate by a factor of five (x5) from 40 Ksps to 8 Ksps.

The resultant 8 Ksps stream of 8-bit voice data is then applied to a 1:2 syllabic decompression module 418. Thus causes each 1 dB change in the level of the incident 8 Ksps data stream to be transformed into a 2 dB change. The decompression module 418 is designed using conventional techniques to allow processing of FM speech over a wider dynamic range than would otherwise be possible. The voice demodulation process is completed within a μ-Law compression block 420, which inserts the resultant 8 Ksps stream of 8-bit voice data into an allocated time slot of the TDM receive bus 32a.

As described above, BCH-encoded messages are combined by the digital data modulator 118 into FOVC and FOCC data blocks, which are subsequently used in creation of a Manchester-encoded waveform via FSK modulation. Specifically, digital data modulator 118 generates a sampled FSK-modulated waveform in which four samples are used to represent each bit of Manchester code. In the exemplary embodiment, a substantially similar data modulation process is assumed to occur within the mobile units from which RVC or RCC data blocks are received. Accordingly, the data extraction network 314 is designed to extract the messages encoded in this manner from the received RVC and RCC data blocks.

Following successful DOT sequence detection, the data extraction network 314 establishes a local clock phase by determining zero-crossings based on the most recently received 16 Manchester code samples, which correspond to the four most recently received Manchester code bits. Once clock phase has been established, it is assumed to remain so until detection of the next DOT sequence within the received data block.

The Manchester code may be detected and recovered using, for example, a four-tap integrate & dump matched filter followed by a comparator. Next, word synchronization and descrambling operations are performed. In the exemplary embodiment the descrambling process comprises BCH decoding of the one to five repetitions of the BCH-encoded message (i.e., scrambled word) within each received data block. A field accompanying each repetition of the scrambled word indicates the number of repetitions of the scrambled word within the received data block. Each repetition of the scrambled word is then buffered until the total indicated number of repetitions are received.

Bit-by-bit reconstruction of the scrambled word is then performed by majority vote using table look-up to determine the most probable bit, as well as the number of bit errors. The scrambled word produced by this process of majority vote is then BCH-decoded using conventional techniques, thereby yielding the message originally encoded and transmitted by a given mobile unit.

IX. Multi-Sector Diversity Communication

As mentioned above, in alternate embodiments the antenna system 12 is implemented as three or more distinct sector antennas disposed to independently service different cell sectors. The base station 10 is designed to be easily modified for operation with such a sectored antenna system, as well as with a sectored antenna system in which diversity reception is provided within each sector. In embodiments designed to facilitate diversity reception, pairs of sectored antennas are deployed in each sector to receive signals from mobile users within the sector. For a three-sectored antenna system, separate wideband transceiver modules are interposed between each of the three sector antennas, or between the pair of diversity antennas servicing each sector, and the local receive bus 24. The signal energy received from each such sector antenna, or from each individual diversity antenna within each sector, is then inserted by the WBRX section of each wideband transceiver module into a specific time slot on the local receive bus 24.

In like manner, transmission to a given mobile user in diversity implementations occurs through the diversity antenna within the mobile unit's sector affording the most advantageous signal path to the mobile unit. By time-division multiplexing the local transmit bus 84 into a set of time slots equivalent to the number of individual diversity antennas (e.g., six antennas for three sectors), it is possible to assign each diversity antenna to a different time slot. Hence, each DTX channel module is able to insert its baseband signal data into the time slot of the local transmit bus 84 associated with the diversity antenna best able to broadcast information to the mobile unit assigned to the time slot.

Figure 14:
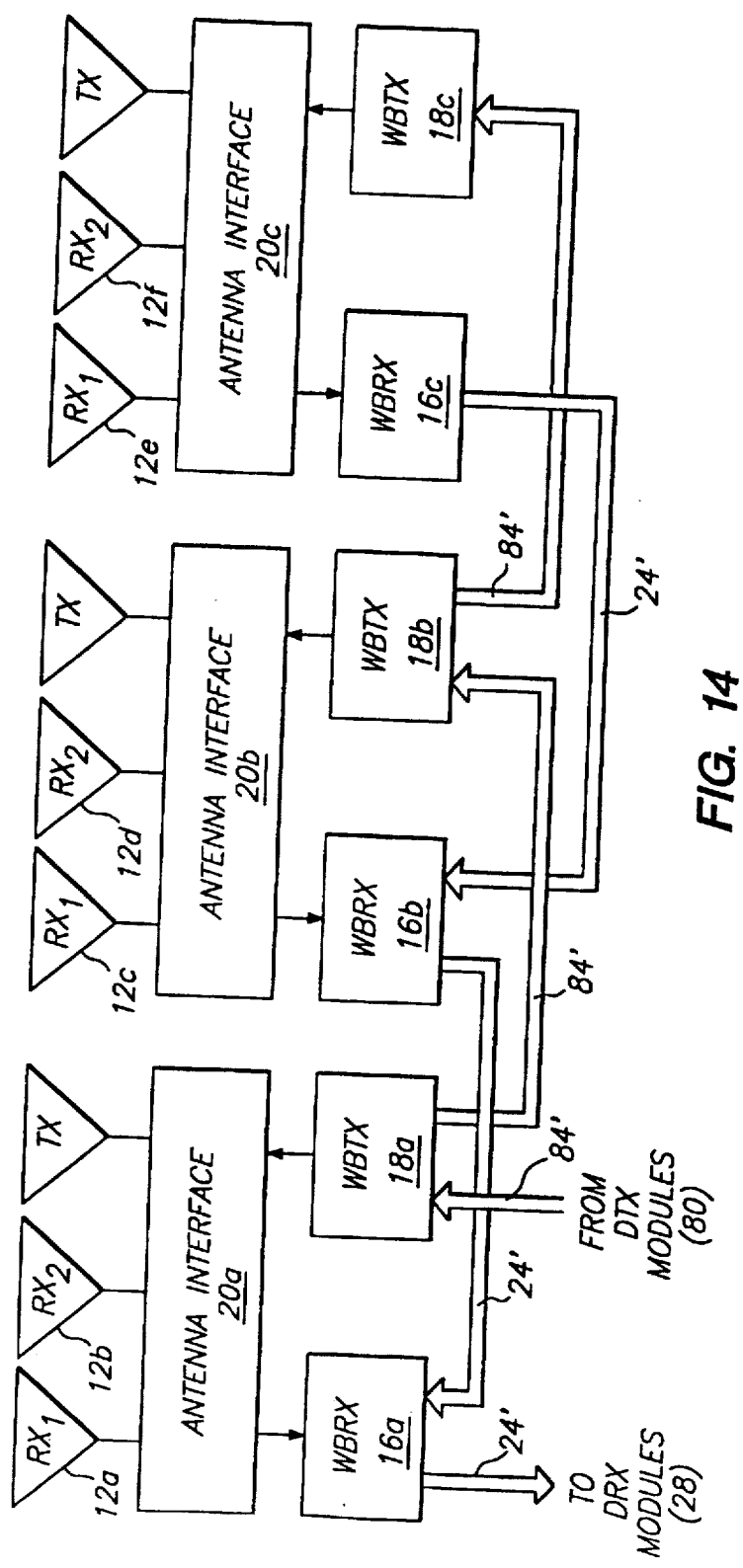
FIG. 14 depicts an exemplary signal distribution scheme for use in diversity signal reception by the inventive base station.

FIG. 14 depicts an exemplary manner in which signals may be coupled between the local transmit/receive buses (84', 24') and a set of six diversity antennas 12a-12f. Each pair of diversity antennas (12a,12b), (12c,12d) and (12e,12f) is assumed to be deployed in a different one of the three sectors of a three-sectored cell. The two receive diversity antennas (12a, 12b) within the first cell sector are seen to be coupled to a first antenna unit 20a. Similarly, the two receive diversity antennas (12c,12d) within the second cell sector and the two receive diversity antennas (12e,12f) within the third cell sector are coupled to second and third antenna units 20b and 20c, respectively.

In the embodiment of FIG. 14, both the local transmit and receive buses 84' and 24' are multiplexed into six time slots, each time slot being assigned to one of the antennas 12a-12f. For example, antennas 12a and 12b could be assigned to the first and third time slots, antennas 12c and 12d to the second and fifth time slots, and antennas 12e and 12f to the fourth and sixth time slots, respectively. The local transmit bus 84' is initially routed to a first WBTX section 18a of a first wideband transceiver module from the DTX modules 80. The first WBTX section 18a generates the r.f. output to be transmitted using the wideband data within an assigned time slot(s) (e.g., the first slot) of the local transmit bus 84'.

As indicated by FIG. 14, the local receive bus 24' originates at the WBRX section 16c of a third wideband transceiver comprised of the WBRX section 16c and a WBTX section 18c. The local receive bus 24', like the local transmit bus 84', is partitioned into six time slots associated on a one-to-one basis with the antennas 12a-12f. The local receive bus 24' is seen to extend between the WBRX sections 16b and 16c, as well as between the WBRX sections 16a and 16b, and further serves to link the WBRX section 16a to the DRX modules 28. Since the local receive bus 24' is made available to each of the K DRX receive channel modules within each DRX module 28 (FIG. 10), any frequency channel received by any one of the diversity sector antennas 12a-12f may be processed by any one of the DRX receive channel modules.

X. Exemplary Physical Realization as a VXIbus Subsystem

Figure 15:
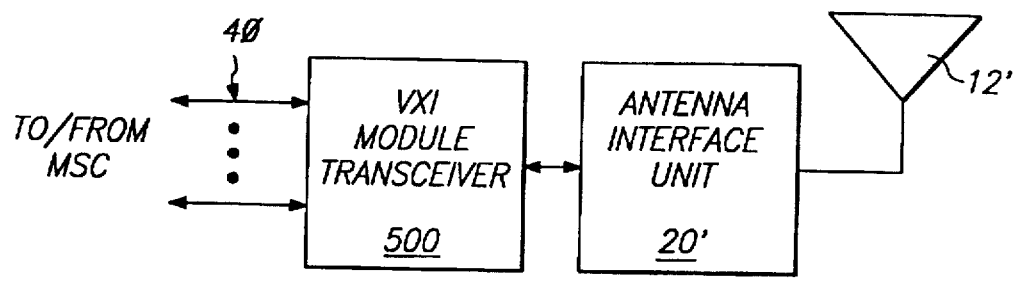
FIG. 15 is a block diagrammatic representation of an exemplary VXI bus modular realization of the inventive base station.

FIG. 15 is a block diagrammatic representation of an exemplary VXIbus modular realization of the inventive base station. The modular embodiment of FIG. 15 includes a VXI module transceiver 500 comprised of a VXIbus subsystem, within which are incorporated a plurality of VXIbus modules of the type specified by IEEE Std. 1155. Each VXIbus module is used to implement a BSC, DTX, DRX, or wideband transceiver module, and may be physically realized using a printed circuit board (PCB) or the equivalent. The local receive and transmit buses 24 and 84, as well as the TDM receive and transmit buses 32a and 32b, are comprised of a set of electrical buses collectively forming a VXIbus backplane. In this regard the TDM receive and transmit buses 32a and 32b may each be realized as a VXIbus Trigger Bus of the type specified by IEEE Std. 1155. Similarly, the local receive and transmit buses 24 and 84 may each be implemented as a VXIbus Local Bus in accordance with IEEE Std. 1155.

Figure 16A:
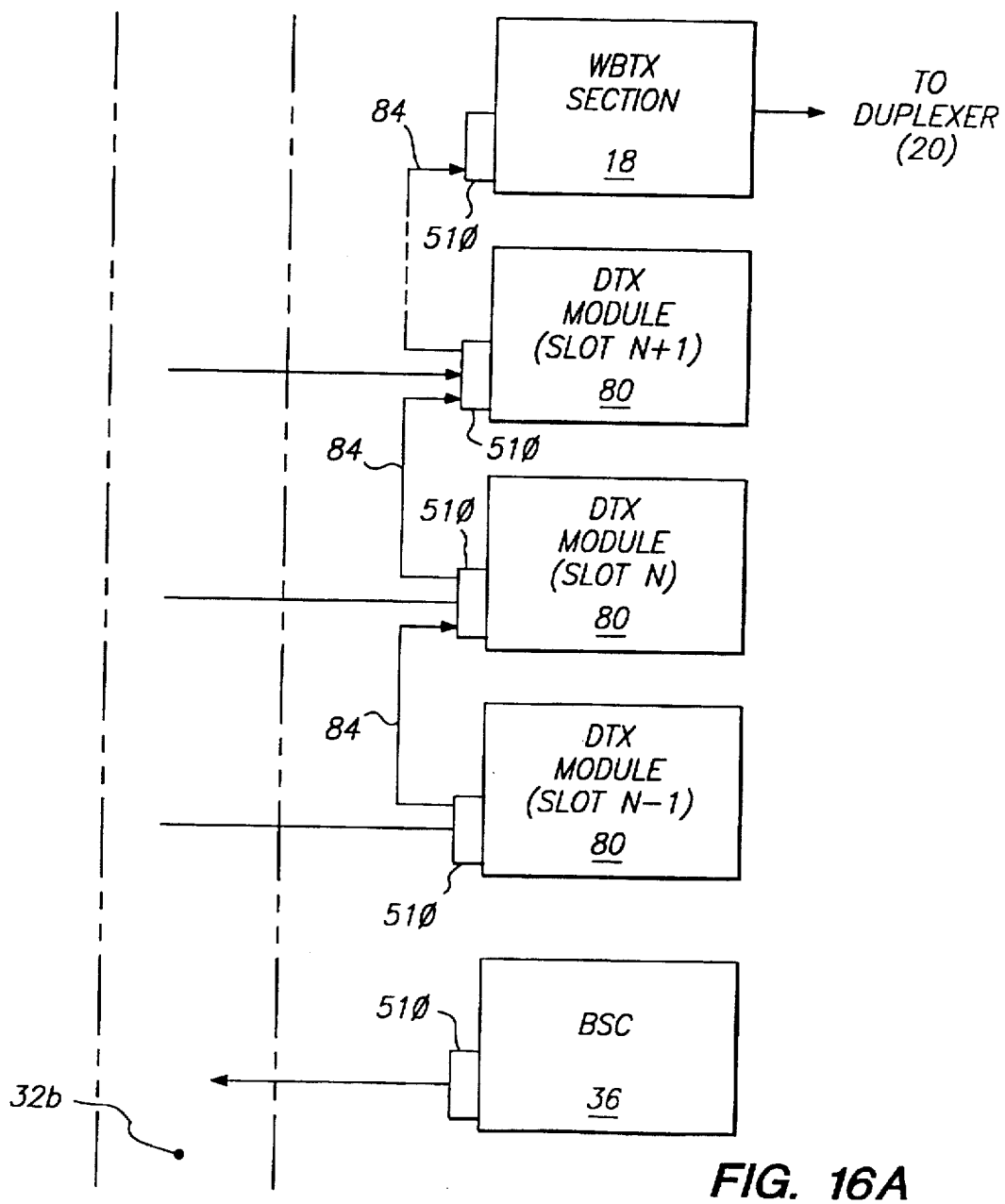
FIG. 16A is a block diagram of a transmit portion of a VXI module transceiver included.

FIG. 16A is a block diagram of the transmit portion of the VXI module transceiver 500. The transmit portion includes a set of DTX modules 80, each of which is assigned to a one of thirteen VXIbus "slots" (i.e., hardware addresses). The DTX modules 80, as well as the WBTX module 18, are coupled via "P3-type" connectors 510 to the TDM transmit bus 32b of the VXIbus backplane. Each P3-type connector 510 meets the specifications set forth in IEC Std. 1155. Similarly, P3-type connectors 510 are used to connect the DTX modules 80 and the WBRX module 16 to the local transmit bus 84 of the VXI backplane.

Figure 16B:
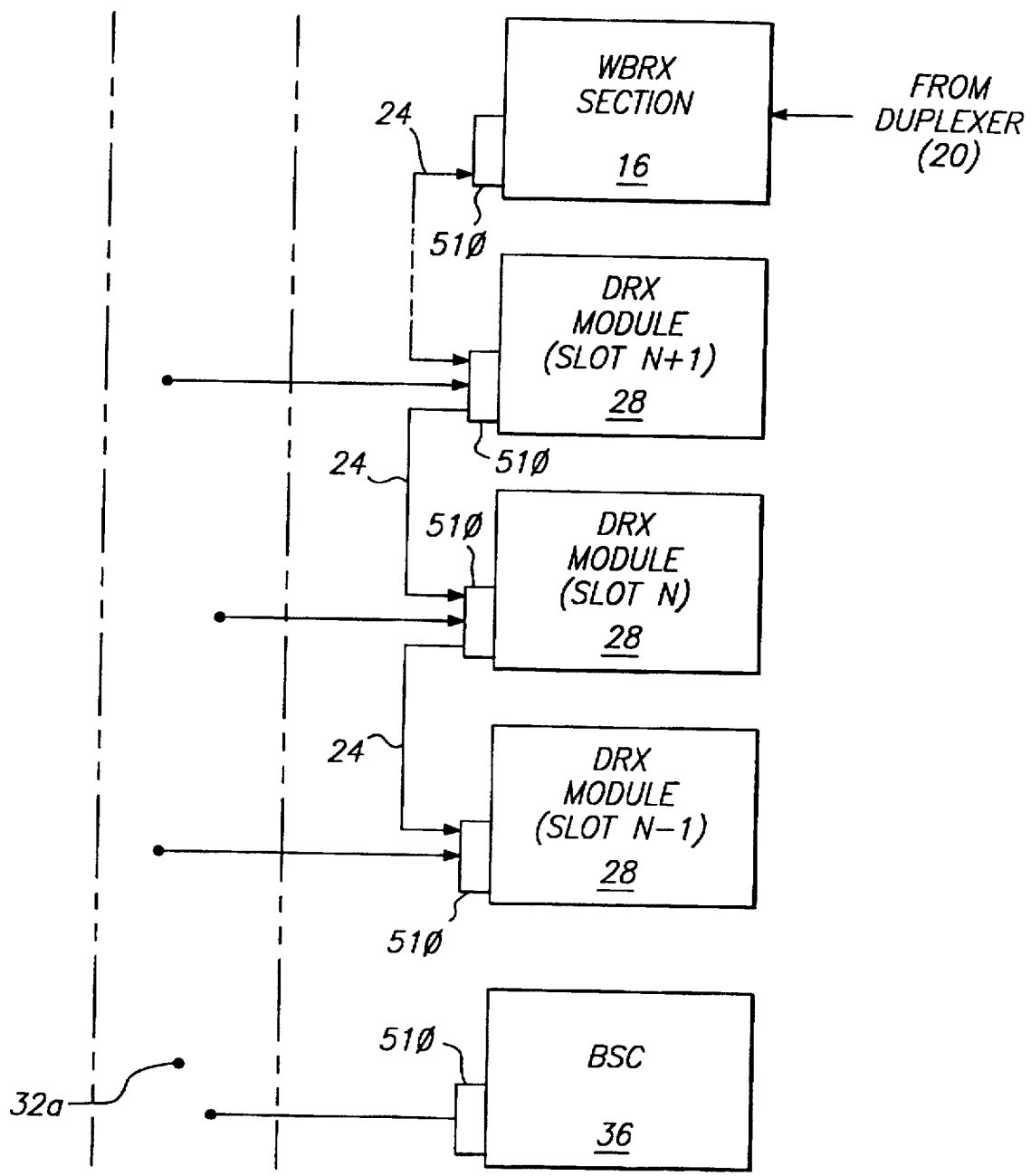
FIG. 16B is a block diagram of a receive portion of the VXI module transceiver.

FIG. 16B similarly depicts the receive portion of the VXI module transceiver 500 in block diagram form. In addition to the WBRX and BSC modules 16 and 36, the receive portion includes a set of DRX modules 28. Each of the DRX, WBRX and BSC modules are assigned to a particular VXIbus slot having a unique address. Again, P3-type connectors 510 are employed to couple the DRX, WBRX and BSC modules as necessary to the TDM receive and local receive buses 32a and 24 of the VXI backplane.

The VXIbus implementation of the inventive base station exemplified by FIGS. 15-17B may be configured to support a variety of air interface standards (e.g., CDMA, TDMA, GSM). In this regard DTX and DRX modules designed to effect modulation/demodulation and other signal processing required by a given air interface standard may be introduced as necessary into the VXIbus subsystem. For example, CDMA chip sets for incorporation into the DTX and DRX modules are commercially available from Qualcomm, Inc. of San Diego, Calif.

While the invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A wideband transmitter system for simultaneously transmitting a plurality of information signals provided by a corresponding plurality of input signal lines, comprising:

an input line interface configured to multiplex said plurality of information signals onto an input data bus;

a plurality of digital transmit modules coupled to said input data bus, each digital transmit module configured to process one or more of said information signals to produce one or more corresponding baseband signals, and each digital transmit module including:

(a) a modulator coupled to said iput data bus and configured to modulate a digital carrier siginal using one or more of said information signals in order to produce a modulated signal; and (b) a digital frequency synthesizer coupled to said modulator and configured to translate said modulated signal to a predefined baseband frequency in order to produce said one or more baseband signals;

a wideband summation network coupled to said plurality of digital transmit modules and configured to add said one or more baseband signals from each of said digital transmit modules to produce a composite baseband signal onto a wideband data bus; and a wideband transmitter coupled to said wideband data bus and configured to generate a transmission waveform in response to said composite baseband signal to simultaneously transmit said information signals.

2. The wideband transmitter system of claim 1 wherein each of said digital frequency synthesizers includes a digital oscillator selectively tuned to a different frequency.

3. The wideband transmitter system of claim 1 wherein said wideband summation network includes a plurality of digital adders, each of which is coupled to one of said digital frequency synthesizers and receives said one or more baseband signals produced thereby.

4. A wideband transmitter system for simultaneously transmitting a plurality of information signals provided by a corresponding plurality of input signal lines, comprising:

an input line interface configured to multiplex said plurality of information signals onto an input data bus;

a plurality of digital transmit modules coupled to said input data bus, each digital transmit module including a set of channel modules configured to produce a set of digital baseband signals of different frequencies corresponding to a set of said plurality of information signals, and each channel module including;

(a) a modulator coupled to said input data bus and configured to modulate a digital carrier signal using one or more of said information signals in order to produce a modulated signal; and (b) a digital frequency synthesizer coupled to said modulator and configured to translate said modulated signal to a predefined basband frequency in order to produce one or more of said set of digital baseband signals;

a wideband summation network coupled to said digital transmit modules and configured to route a wideband data stream through said plurality of digital transmit modules and to add said set of digital baseband signals to said wideband data stream and onto a wideband data bus; and a wideband transmitter coupled to said wideband data bus and configured to generate a wideband transmission waveform from said wideband data stream to simultaneously transmit said information signals.

5. The wideband transmitter system of claim 4 wherein said wideband transmitter includes:

a digital to analog converter for converting said wideband data stream to an analog data waveform, and a wideband up-converter for modulating a radio frequency carrier signal using said analog data waveform.

6. A wideband receiver system for receiving an incident composite signal containing a plurality of information signals, comprising:

a wideband receiver configured to simultaneously receive said information signals as said incident composite signal and to generate a representation of said incident composite signal in the form of a data stream;

a baseband data bus coupled to said wideband receiver to which is applied said baseband data stream;

a plurality of digital receive modules coupled to said baseband data bus, each receive module configured to process said baseband data stream to produce one or more of said information signals, and each digital receive module including;

(a) a digital tuner coupled to said baseband data bus and configured to provide a digital representation of one or more of said information signals from said baseband data stream; and (b) a demodulator coupled to said digital tuner and configured to demodulate said digital representation to provide one or more demodulated bit streams;

an output voice/data bus coupled to said plurality of digital receive modules onto which are applied said one or more demodulated bit streams to form a composite output bit stream; and an output line interface coupled to said output voice/data bus and configured to distribute said plurality of demodulated bit streams within said composite output bit stream to a corresponding plurality of output signal lines.

7. The wideband receiver system of claim 6 wherein each of said digital receive modules further includes a decimator configured to decimate said digital representation of one or more of said information signals.

8. The wideband receiver system of claim 6 wherein each of said digital tuners includes a digital oscillator tuned to a different frequency.

9. The wideband receiver system of claim 6 wherein said wideband receiver includes:

a wideband down-converter for down-converting a frequency of said incident composite signal to a baseband signal; and an analog to digital converter coupled to said wideband down-converter and configured to convert said baseband signal to said baseband data stream.

10. A wideband receiver system for receiving an incident composite signal containing a plurality of information signals, comprising:

a wideband receiver configured to simultaneously receive said information signals as said incident composite signal and to generate a digital representation of said incident composite signal in the form of a wideband digital data stream;

a wideband data bus coupled to said wideband receiver to which is applied said wideband digital data stream;

a plurality of digital receive modules coupled to said wideband data bus, each digital receive module including:

(a) a digital tuner coupled to said wideband data bus and configured each digital tuner disposed to provide a digital representation of one or more of said information signals from said wideband digital data stream; and (b) a demodulator configured to generate a set of demodulated digital signals wherein each said set of demodulated digital signals is derived from a corresponding set of said plurality of information signals; and an interface module for providing each said set of demodulated digital signals to a corresponding set of output signal lines.

11. The wideband receiver system of claim 10 wherein a first of said plurality of digital receive modules includes:

a first plurality of digital tuners coupled to said wideband data bus and a first plurality of demodulators coupled to said first plurality of digital tuners.

12. A wideband digital transceiver system for transmitting a plurality of outbound information signals and receiving a plurality of inbound information signals, comprising:

an input line interface configured to multiplex said plurality of outbound information signals onto a TDM transmit bus;

a plurality of digital transmit modules coupled to said TDM transmit bus, each digital transmit module configured to process one or more of said outbound information signals to produce one or more corresponding outbound baseband signals, and each digital transmit module including;

(a) a modulator coupled to said TDM data bus and configured to modulate a digital carrier signal using one or more of said outbound information signal in order to produce an outbound modulated signal; and (b) a digital frequency synthesizer coupled to said modulator and configured to translate said outbound modulated signal to a predefined baseband frequency in order to produce said one or more outbound baseband signals;

a wideband summation network coupled to said plurality of digital transmit modules and configured to add said one or more outbound baseband signals from each of said digital transmit modules into a composite baseband data stream;

a wideband transmitter coupled to said wideband summation network and configured to generate a wideband transmission waveform from said composite baseband data stream to simultaneously transmit said outbound information signals;

a wideband receiver configured to simultaneously receive said inbound information signals as an incident composite signal and to generate a digital representation of said incident composite signal in the form of a wideband digital data stream;

a wideband data bus coupeled to said wideband receiver to which is applied said wideband digital data stream;

a plurality of digital receive modules coupled to said wideband data bus, each receive module configured to process said wideband data stream to produce one or more of said inbound information signals and to multiplex said one or more inbound information signals onto a TDM receive bus, and each digital receive module including;

(a) a digital tuner couuned to said wideband data bus and configured to provide a digital representation of one or more of said information signals from said wideband digital data stream; and (b) a demodulatr coupled to said digital tuner and configured to demodulate said digital representation to prvide one or more demodulated bit stream;

an output line interface coupled to said digital receive modules and configured to distribute said demodulated bit streams to a plurality of output signal lines.

13. The wideband digital transceiver system of claim 12 wherein each digital transmit module further includes a digital frequency synthesizer coupled to said modulator, each digital frequency synthesizer translating a frequency of said modulated signal to a predefined baseband frequency.

14. A method for combining a plurality of information signals provided by a corresponding plurality of input signal lines to transmit a wideband transmission waveform, said method comprising the steps of:

multiplexing said plurality of information signals onto an input data bus;

in a plurality of digital transmit modules coupled to said input data bus, simultaneously performing the steps of;

(a) modulating a digital carrier signal using one or more of said information signals in order to produce a modulated signal; and (b) simultaneously translating said modulated signal to a predefined baseband frequency thereby producing one or more baseband signals;

combining said baseband signals to create a composite baseband data stream; and generating said transmission waveform by using said composite baseband data stream to modulate an analog carrier signal.

15. A method of processing an incident composite signal containing a plurality of information signals, said method comprising the steps of:

simultaneously receiving said information signals as said incident composite signal and generating a digital representation of said incident composite signal in the form of a wideband digital data stream applied to a wideband data bus;

in a plurality of digital receive modules coupled to said wideband data bus, simultaneously peforming the steps of;

(a) recovering a digital representation of one or more of said information signals from said wideband digital data stream; and (b) demodulating said digital representations of said information signals to provide one or more demodulated bit streams;

multiplexing said demodulated bit streams onto an output data bus in order to generate a composite output bit stream; and distributing said demodulated bit streams within said composite output bit stream to a corresponding plurality of output signal lines.

16. A wideband transmitter for simultaneously communicating with a first mobile station and a second mobile station, comprising:

an outbound narrowband data bus adapted to receive a first outbound informnation signal and a second outbound information signal from a external structure;

a first digital transmit module coupled to said outbound narrowband data bus and configured to receive said first outbound information signal from said outbound narrowband data bus and to convert said first outbound information signal to a first outbound baseband signal, said first digital transmit module including;

(a) a first modulator coupled to said outbound narrowband data bus and configured to modulate a digital carrier signal using said first outbound information signal in order to produce a first outbound modulated signal; and (b) a first digital frequency synthesiser coupled to said first modulator and configured to translate said first outbound modulated signal to predefined first baseband frequency in order to produce said first outbound baseband signal;

a second digital transmit module coupled to said outbound narrowband data bus and configured to receive said second outbound information signal from said outbound narrowband data bus and to convert said second outbound information signal to a second outbound baseband signal said second digital transmit module including;

(a) a second modulator coupled to said outbound narrowband data bus and configured to modulate a digital carrier signal using said second outbound information signal in order to produce a second outbound modulated signal; and (b) a second digital frequency synthesizer coupled to said second modulator and configured to translate said second outbound modulated signal to a predefined second baseband frequency in order to produce said second outbound baseband signal;

a combiner coupled to said first digital transmit module and said second digital transmit module and an outbound baseband data bus and configured to combine said first outbound baseband signal and said second outbound baseband signal as a composite outbound baseband signal and to provide said composite outbound baseband signal to said outbound baseband data bus; and a wideband trmnsmitter coupled to said outbound baseband data bus and configured to modulate said comnposite outbound baseband signal and to transmit an outbound wideband signal to simultaneouly communicate with said first mobile station and said second mobile station.

17. A wideband receiver for simultaneously communicating with a first mobile station and a second mobile station, comprising:

a wideband receiver configured to receive and demodulate a composite inbound radio frequency signal to a composite inbound baseband signal onto an inbound baseband data bus;

a distributor coupled to said inbound baseband data bus and configured to distribute said composite inbound baseband signal to a plurality of digital receive modules;

a first digital receive module coupled to said distributor and configured to demodulate a portion of sad composite inbound baseband signal and to generate a first inbound narrowband signal said first digital receive module including;

(a) a digital tuner coupled to said inbound baseband data bus and configured to provide a digital representation of a first inbound information signal from said composite inbound baseband signal; and (b) a demodulator coupled to said digital tuner and configured to demodulate said first inbound information signal to prvide said first inbound narrowband signal;

a second digital receive module coupled to said distributor and configured to demodulate a portion of said composite inbound baseband signal and to generate a second inbound narrowband signal said second digital receive module including;

(a) a digital tuner coupled to said inbound baseband data bus and configured to provide a digital representaton of a second inbound information signal from said composite inbound baseband signal; and (b) a demodulator coupled to said digital tuner and configured to demodulate said second inbound information signal to provide said second inbound narrowband signal; and an inbound narrowband data bus coupled to said first digital receive module and said second digital receive module and configured to communicate said first inbound narrowband signal and said second inbound narrowband signal to an external structure.

18. A wideband base station for simultaneously communicating with a first mobile station and a second mobile station, comprising:

a wideband transceiver configured to modulate a composite outbound baseband signal from an outbound baseband data bus and transmit a composite outbound radio frequency signal, and to receive and demodulate a composite inbound radio frequency signal to an inbound baseband signal onto an inbound baseband data bus;

an outbound narrowband data bus adapted to receive a first outbound information signal and a second outbound information signal from a external structure;

a first digital transmit module coupled to said outbound narrowband data bus and configured to receive said first outbound information signal from said outbound narrowband data bus and to convert said first outbound information signal to a first outbound baseband signal, said first digital transmit module including;

(a) a first modulator coupled to said outbound narrowband data bus and configured to modulate a digital carrier signal using said first outbound information signal in order to produce a first outbound modulated signal; and (b) a first digital frequency synthesizer coupled to said first modulator and configured to translate said first outbound modulated signal to a predefined first baseband frequency in order to produce said first outbound baseband signal;

a second digital transmit module coupled to said outbound narrowband data bus and configured to receive said second outbound information signal from said outbound narrowband data bus and to convert said second outbound information signal to a second outbound baseband signal said second digital transmit module including;

(a) a second modulator coupled to said outbound narrowband data bus and configured to modulate a digital carrier signal using said second outbound information signal in order to produce a second outbound modulated signal; and (b) a second digital frequency synthesizer coupled to said second modulator and configured to translate said second outbound modulated signal to a predefined second baseband frequency in order to produce said second outbound baseband signal;

a combiner coupled to said first digital transmit module and said second digital transmit module and said outbound baseband data bus and configured to combine said first outbound baseband signal and said second outbound baseband signal as said composite outbound baseband signal and to provide said composite outbound baseband signal to said outbound baseband data bus;

a distributor coupled to said inbound baseband data bus and configured to distribute said composite inbound baseband signal to a plurality of digital receive modules;

a first digital receive module coupled to said distributor and configured to demodulate a portion of said composite inbound baseband signal and to generate a first inbound narrowband signal, said first digital receive module including;

(a) a digital tuner coupled to said inbound baseband data bus and configured to provide a digital reprsentation of a first inbound information signal from said composite inbound baseband signal; and (b) a demodulator coupled to said digital tuner and configured to demodulate said first inbound information signal to provide said first inbound narrowband signal;

a second digital receive module coupled to said distributor and configured to demodulate a portion of said composite inbound baseband signal and to generate a second inbound narrowband signal, said second digital receive module including;
(a) a digital tuner coupled to said inbound baseband data bus and configured to provide a digital representation of a second inbound information signal from said composite inbound baseband signal; and
(b) a demodulator coupled to said digital tuner and configured to demodulate said second inbound information signal to provide said second inbound narrowband signal; and an inbound narrowband data bus coupled to said first digital receive module and said second digital receive module and configured to communicate said first inbound narrowband signal and said second inbound narrowband signal to an external structure.

* * * * *